United States Patent
Kim et al.

(10) Patent No.: US 10,887,919 B2
(45) Date of Patent: *Jan. 5, 2021

(54) METHOD AND APPARATUS FOR TRANSMITTING AND RECEIVING DATA USING PLURALITY OF CARRIERS IN MOBILE COMMUNICATION SYSTEM

(71) Applicant: Samsung Electronics Co., Ltd., Suwon-si (KR)

(72) Inventors: Soeng Hun Kim, Suwon-si (KR); Gert Jan Van Lieshout, Staines (GB); Sang Bum Kim, Suwon-si (KR); Kyeong In Jeong, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/131,699

(22) Filed: Sep. 14, 2018

(65) Prior Publication Data

US 2019/0014601 A1 Jan. 10, 2019

Related U.S. Application Data

(63) Continuation of application No. 15/803,197, filed on Nov. 3, 2017, now Pat. No. 10,111,257, which is a (Continued)

(51) Int. Cl.
*H04W 74/08* (2009.01)
*H04B 7/26* (2006.01)
(Continued)

(52) U.S. Cl.
CPC .......... *H04W 74/0833* (2013.01); *H04B 7/26* (2013.01); *H04L 1/18* (2013.01);
(Continued)

(58) Field of Classification Search
None
See application file for complete search history.

(56) References Cited

U.S. PATENT DOCUMENTS

| 6,201,972 B1 | 3/2001 | Hamabe |
| 8,203,987 B2 | 6/2012 | Ishii et al. |

(Continued)

FOREIGN PATENT DOCUMENTS

| CN | 101682896 A | 3/2010 |
| EP | 0946071 A2 | 9/1999 |

(Continued)

OTHER PUBLICATIONS

ETSI TS 136 321 V14.5.0 (Jan. 2018), LTE; Evolved Universal Terrestrial Radio Access (E-UTRA);Medium Access Control (MAC) protocol specification (3GPP TS 36.321 version 14.5.0 Release 14).*

(Continued)

*Primary Examiner* — Hassan A Philips
*Assistant Examiner* — Gautam Sharma
(74) *Attorney, Agent, or Firm* — Jefferson IP Law, LLP

(57) ABSTRACT

The present disclosure relates to converging a 5th-Generation (5G) communication system for supporting higher data rates beyond a 4th-Generation (4G) system with a technology for Internet of Things (IoT), and may be applied to intelligent services, such as smart home, smart building, smart city, smart car, connected car, health care, digital education, smart retail, security and safety services. A method according to disclosed aspects includes receiving a first control message including a first random access response window for a first cell group, receiving a second control message for adding a second cell group, including information on a second random access response window size for the second cell group, transmitting, on a cell of the (Continued)

US 10,887,919 B2
Page 2 second cell group, a random access preamble, and monitoring, on the cell of the second cell group, a random access response based on the second random access response window size for the second cell group.

14 Claims, 18 Drawing Sheets

Related U.S. Application Data continuation of application No. 14/396,259, filed as application No. PCT/KR2013/003629 on Apr. 26, 2013, now Pat. No. 9,814,075.

(60) Provisional application No. 61/653,026, filed on May 30, 2012, provisional application No. 61/644,645, filed on May 9, 2012.

(51) Int. Cl.
  *H04L 1/18*  (2006.01)
  *H04W 16/18*  (2009.01)
  *H04W 48/00*  (2009.01)
  *H04L 5/00*  (2006.01)
  *H04W 28/18*  (2009.01)

(52) U.S. Cl.
  CPC .............. *H04L 1/188* (2013.01); *H04L 5/001* (2013.01); *H04W 16/18* (2013.01); *H04W 48/00* (2013.01); *H04L 5/0053* (2013.01); *H04W 28/18* (2013.01); *Y02D 30/70* (2020.08)

(56) References Cited

U.S. PATENT DOCUMENTS

| | | |
|---|---|---|
| 2008/0160918 A1 | 7/2008 | Jeong et al. |
| 2009/0191874 A1* | 7/2009 | Du ...................... H04W 36/18 455/436 |
| 2009/0296643 A1 | 12/2009 | Cave et al. |
| 2009/0323608 A1 | 12/2009 | Adachi et al. |
| 2010/0002590 A1 | 1/2010 | Park et al. |
| 2010/0039988 A1* | 2/2010 | Narasimha ............ H04W 12/08 370/328 |
| 2010/0111032 A1* | 5/2010 | Wu ................... H04W 74/0833 370/331 |
| 2010/0118805 A1 | 5/2010 | Ishii et al. |
| 2010/0144361 A1 | 6/2010 | Gholmieh et al. |
| 2010/0177831 A1 | 7/2010 | Kim et al. |
| 2010/0265873 A1 | 10/2010 | Yi et al. |
| 2010/0317356 A1 | 12/2010 | Roessel et al. |
| 2011/0134774 A1 | 6/2011 | Pelletier et al. |
| 2011/0195668 A1 | 8/2011 | Lee et al. |
| 2012/0002635 A1 | 1/2012 | Chung et al. |
| 2012/0044847 A1 | 2/2012 | Chang |
| 2012/0044898 A1 | 2/2012 | Ishii |
| 2012/0057560 A1 | 3/2012 | Park et al. |
| 2012/0082107 A1 | 4/2012 | Ou et al. |
| 2012/0108199 A1 | 5/2012 | Wang et al. |
| 2012/0314635 A1 | 12/2012 | Lee et al. |
| 2013/0010611 A1* | 1/2013 | Wiemann ............. H04L 1/1867 370/242 |
| 2013/0044726 A1 | 2/2013 | Shrivastava et al. |
| 2013/0070682 A1 | 3/2013 | Kim et al. |
| 2013/0188473 A1 | 7/2013 | Dinan |
| 2013/0201960 A1 | 8/2013 | Kim et al. |
| 2013/0258882 A1 | 10/2013 | Dinan |
| 2013/0258958 A1 | 10/2013 | Dinan |
| 2014/0016593 A1 | 1/2014 | Park et al. |
| 2014/0185595 A1 | 7/2014 | Wu et al. |
| 2015/0103771 A1 | 4/2015 | Kim et al. |
| 2015/0181625 A1* | 6/2015 | Uchino ............ H04W 74/0841 370/329 |
| 2015/0296542 A1 | 10/2015 | Heo et al. |
| 2016/0050652 A1 | 2/2016 | Wu et al. |
| 2016/0255552 A1* | 9/2016 | Uchino ................. H04B 7/024 370/329 |

FOREIGN PATENT DOCUMENTS

| | | |
|---|---|---|
| EP | 2410670 A2 | 1/2012 |
| EP | 2849369 A1 | 3/2015 |
| KR | 10-2008-0054865 A | 6/2008 |
| KR | 10-2008-0073439 A | 8/2008 |
| KR | 10-2010-0122054 A | 11/2010 |
| KR | 10-2011-0036518 A | 4/2011 |
| KR | 10-2012-0034159 A | 4/2012 |
| WO | 2009/132290 A2 | 10/2009 |
| WO | 2010/125969 A1 | 11/2010 |
| WO | 2011/038272 A1 | 3/2011 |
| WO | 2011/099725 A2 | 8/2011 |
| WO | 2011/100492 A1 | 8/2011 |
| WO | 2011/139069 A2 | 11/2011 |
| WO | 2011/155784 A2 | 12/2011 |
| WO | 2011/157292 A1 | 12/2011 |
| WO | 2012/108811 A1 | 8/2012 |
| WO | 2012/137034 A1 | 10/2012 |
| WO | 2013/119018 A1 | 8/2013 |
| WO | 2013/151651 A1 | 10/2013 |

OTHER PUBLICATIONS

3GPP TSG-RAN2 Meeting #77 bis, Jeju, Korea, Mar. 26-30, 2012, Introduction of CA Enhancements in MAC, Ericsson.*
Ericsson, 'Introduction of CA Enhancements in MAC', R2-121988, 3GPP TSG-RAN WG2 Meeting #77bis, Jeju, Korea, Mar. 26-30, 2012.
3GPP TS 36331 V105.0, '3GPP; TSGRAN; E-UTRA; RRC; Protocol specification (Release 10)', Mar. 2012.
Motorola Mobility, 'Comments on SCell RACH Solution B3', R2-121683, 3GPP TSG-RAN WG2 Meeting #77bis, Jeju, Korea, Mar. 26-30, 2012.
HTC, 'TA group configuration and reconfiguration', R2-116340, 3GPP TSG-RAN2#76 meeting, San Francisco, USA, Nov. 14-18, 2011.
Intel Corporation, 'Further discussion on the open issues of RACH on SCell', R2-121721, 3GPP TSG-RAN WG2 Meeting #77bis, Jeju, Korea, Mar. 26-30, 2012.
Huawei et al: "Signaling for the TA Group Management", 3GPP Draft; R2-115827 Singalling for the TA Group Management, 3rd Generation Partnership Project (3GPP), Mobile Competence Centre 650, Route Des Lucioles F-06921 Sophia-Antipolis Cedex France, vol. RAN WG2, No. San Francisco , USA; Nov. 14, 2011-Nov. 18, 2011, Nov. 8, 2011, XP050564319.
CATT: "Signaling for TAG configuration",3GPP Draft; R2-115791 , 3rd Generation Partnership Project (3GPP) , Mobile Competence Centre 650 , Route Des Lucioles F-06921 Sophia-Antipolis Cedex France, vol. RAN WG2, No. San Francisco , USA; Nov. 14, 2011-Nov. 18, 2011, Nov. 8, 2011, XP050564300.
3GPP: "3rd Generation Partnership 1-14 Project; Technical Specification Group Radio Access Network; Evolved Universal Terrestrial Radio Access (EUTRA); Medium Access Control (MAC) protocol specification (Release 10)", 3GPP Draft; 36321-A50 , 3rd Generation Partnership Project (3GPP) , Mobile Competence Centre 650 , Route Des Lucioles F-06921 Sophia-Antipolis Cedex France, Mar. 15, 2012, XP050601449.
Alcatel-Lucent et al: "RA procedure on SCell", 3GPP Draft; [1] R2-120603 RACH V1 , 3rd Generation Partnership Project (3GPP) , Mobile Competence Centre; 650, Route Des Lucioles F-06921 Sophia-Antipolis Cedex France, vol. RAN WG2, No. Dresden , Germany; Feb. 6, 2012-Feb. 10, 2012, Jan. 30, 2012, XP050565204.
Ericsson et al.; Multiple frequency band indicators per cell; 3GPP TSG-RAN WG2 #75; Tdoc R2-114299; Aug. 22-26, 2011; Athens, Greece.
3GPP; 3rd Generation Partnership Project; Technical Specification Group Radio Access Network; Extending 850MHz Study Item Technical Report; (Release 9); Aug. 2011; Valbonne, France.

(56) References Cited

OTHER PUBLICATIONS

Huawei et al.; The MDT applicability of EPLMN; 3GPP TSG-WG2 Meeting #75; R2-114011; Aug. 22-26, 2011; Athens, Greece.
3rd Generation Partnership Project; Technical Specification Group Radio Access Network; Evolved Universal Terrestrial Radio Access (E-UTRA); User Equipment (UE) radio transmission and reception (Release 10); 3GPP Standard; 3GPP TS 36.101, XP050553331, No. V10.3.0, pp. 1-237 Jun. 21, 2011.
Ericsson et al., "Multiple frequency band indicators per cell", 3GPP TSG-RAN2 Meeting #75, R2-114301; Aug. 26, 2011.
3GPP TSG RAN WG2 #77bis, "On the reporting the failed RRC connection establishment", R2-121272; Mar. 26-30, 2012.
Korean Office Action dated Mar. 6, 2019; Application #: 10-2013-0050776.
Korean Office Action dated May 1, 2019; Application #: 10-2013-0051929.
Intellectual Property India examination report dated Nov. 27, 2018; Application #: 2519/KOLNP/2014.
Indian Examination Report dated Sep. 18, 2019, issued in Indian Application No. 3851/KOLNP/2013.
European Search Report dated Jul. 3, 2019, issued in European Application No. 19165270.0-1218.
Catt et al: "Frame and SFN timing in CA". 3GPP Draft; R2-103521. 3rd Generation Partnership Project (3GPP). Mobile Competence Centre; 650, Route Des Lucioles; F-06921 Sophia-Antipolis Cedex; France vol. RAN WG2, No. Stockholm, Sweden; Jun. 28, 2010. Jun. 22, 2010 (Jun. 22, 2010), XP050451101.
ETSI TS 137 320 V10.1.0, Apr. 2011, Universal Mobile Telecommunications System (UMTS); LTE; Universal Terrestrial Radio Access (UTRA) and Evolved Universal Terrestrial Radio Access (E-UTRA); Radio measurement collection for Minimization of Drive Tests (MDT); Overall description; Stage 2, 650 Route des Lucioles F-06921 Sophia Antipolis Cedex, France.
Panasonic, R2-113829, Random Access procedure for multiple TA, 3GPP TSG RAN WG2 #75, Aug. 16, 2011.
Ericsson et al., R2-106133, Introduction of Carrier Aggregation, 3GPP TSG RAN WG2 #72, Nov. 8, 2010.
Extended European Search Report dated Oct. 7, 2019, issued in European Application No. 19184016.4-1218.
Korean Notification of a Decision to Grant a Patent dated Oct. 24, 2019, issued in Korean Application No. 10-2013-0051929.
Korean Office Action dated Dec. 2, 2019, issued in Korean Application No. 10-2013-0046659.
Randy H. Katz, "Adaptation and Mobility in Wireless Information Systems", IEEE Personal Communications, (1994), XP011415559.
3rd Generation Partnership Project; Technical Specification Group Radio Access Network Extending 850MHz Study Item Technical Report, (Release 9), R4-114382 TR 37.806 v1.1.0 change bars, Aug. 17, 2011.
Brazilian Office Action dated Mar. 30, 2020, issued in Brazilian Application No. BR112014004199-7.
Nokia Siemens Networks et al: "Further considerations on intersite OTX/ORX with HSOPA Multiflow", R2-121777, XP050606462, Mar. 20, 2012.
Huawei et al, "Multiflow and OTX/ORX", R2-120554, XP050565442, Jan. 31, 2012.
Korean Office Action dated Feb. 26, 2020, issued in Korean Application No. 10-2012-0087076.
Korean Office Action dated Mar. 30, 2020, issued in Korean Application No. 10-2013-0046659.
Korean Office Action dated Apr. 4, 2020, issued in Korean Application No. 10-2014-7031585.
Korean Office Action dated Jun. 23, 2020, issued in Korean Application No. 10-2014-7031585.
Korean Notice of Allowance dated Oct. 21, 2020, issued in Korean Applicaion No. 10-2014-7031376.

* cited by examiner

METHOD AND APPARATUS FOR TRANSMITTING AND RECEIVING DATA USING PLURALITY OF CARRIERS IN MOBILE COMMUNICATION SYSTEM

CROSS-REFERENCE TO RELATED APPLICATION(S)

This application is a continuation of U.S. application Ser. No. 15/803,197, filed on Nov. 3, 2017, and a continuation of a U.S. application Ser. No. 14/396,259, filed Oct. 22, 2014, which was the National Stage of International application PCT/KR2013/003629 filed on Apr. 26, 2013, which has issued as U.S. Pat. No. 9,814,075 on Nov. 7, 2017, and was based on and claimed the benefit under 35 U.S.C. § 119(e) of a U.S. Provisional application filed on May 30, 2012 in the U.S. Patent and Trademark Office and assigned Ser. No. 61/653,026, and of a U.S. Provisional application filed on May 9, 2012 in the U.S. Patent and Trademark Office and assigned Ser. No. 61/644,645, the entire disclosure of each of which is hereby incorporated by reference.

TECHNICAL FIELD

The present invention relates to a multicarrier-based data transmission/reception method and apparatus for use in a mobile communication system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Mobile communication systems were developed to provide mobile users with communication services. With the rapid advance of technologies, the mobile communication systems have evolved to the level capable of providing high speed data communication service beyond the early voice-oriented services.

Recently, standardization for a Long Term Evolution (LTE) system, as one of the next-generation mobile communication systems, is underway in the 3rd Generation Partnership Project (3GPP). LTE is a technology for realizing high-speed packet-based communications with the data rate of up to 100 Mbps, which is higher than the currently available data rate, and its standardization is almost complete.

In line with the completion of the LTE standardization, an LTE-Advanced (LTE-A) system is now under discussion, which improves a transfer rate by combining the LTE communication system with several new technologies. One of such technologies is Carrier Aggregation. The Carrier Aggregation is a technology allowing a terminal to use multiple downlink carriers and multiple uplink carriers unlike the conventional technology of using one downlink carrier and one uplink carrier for data communication.

Currently, the LTE-A is featured with the intra-eNB carrier aggregation only. This restricts applicability of the carrier aggregation function so as to a problem of failing aggregation of macro and pico cells in a scenario where a plurality of pico cells and a macro cell operate in an overlapped manner.

DISCLOSURE OF INVENTION

Technical Problem

The present invention has been conceived to solve the above problem and aims to provide an inter-eNB carrier aggregation method and apparatus.

Technical Solution

In accordance with an aspect of the present invention, a communication method of a terminal in a mobile communication system includes receiving an SCell add command including configuration information of a secondary serving cell (SCell) to be added from a primary serving cell (PCell), transmitting a preamble to the SCell to be added, receiving a Random Access Response (RAR) message from the SCell to be added, and applying, when the SCell add command includes an indicator indicating that a first base station to which the SCell to be added belongs differs from a base station to which the PCell belongs, a parameter included in the RAR to the SCell which has transmitted the RAR.

Preferably, the method further includes applying, when the SCell add command includes an indicator indicating that a first base station to which the SCell to be added belongs differs from a base station to which the PCell belongs, a maximum number of HARQ retransmissions which is included in the SCell configuration information.

Preferably, applying, when the SCell add command includes an indicator indicating that a first base station to which the SCell to be added belongs differs from a base station to which the PCell belongs, a parameter included in the RAR to the SCell which has transmitted the RAR includes applying, when the SCell add command includes an indicator indicating that the first base station to which the SCell to be added differs from the base station to which the PCell belongs, at least one of a uplink Timing Advance (TA) and a Transmit Power Control (TPC) included in the RAR to the SCell which has transmitted the RAR.

Preferably, the configuration information of the SCell includes a ra-window size.

In accordance with another aspect of the present invention, a communication method of a base station in a mobile communication system includes transmitting an SCell add command including configuration information of a secondary serving cell (SCell) to be added, wherein the SCell add command includes an indicator indicating that a first base station to which the SCell to be added differs from the base station to which a primary serving cell (PCell) belongs.

In accordance with another aspect of the present invention, a communication method of a base station in a mobile communication system includes receiving a preamble from a terminal and transmitting, when a first base station to which a secondary serving cell (SCell) to be added differs from a second base station to which a primary serving cell (PCell) belongs, a Random Access Response (RAR) message to the terminal.

In accordance with another aspect of the present invention, a terminal includes a transceiver which communicates with a base station and a controller which controls receiving an SCell add command including configuration information of a secondary serving cell (SCell) to be added from a primary serving cell (PCell), transmitting a preamble to the SCell to be added, receiving a Random Access Response (RAR) message from the SCell to be added, and applying, when the SCell add command includes an indicator indicating that a first base station to which the SCell to be added belongs differs from a base station to which the PCell belongs, a parameter included in the RAR to the SCell which has transmitted the RAR.

In accordance with another aspect of the present invention, a base station includes a transceiver which communicates with a terminal and a controller which controls transmitting an SCell add command including configuration information of a secondary serving cell (SCell) to be added, wherein the SCell add command includes an indicator indicating that a first base station to which the SCell to be added differs from the base station to which a primary serving cell (PCell) belongs.

In accordance with still another aspect of the present invention, a base station includes a transceiver which communicates with a terminal; and a controller which controls receiving a preamble from a terminal and transmitting, when a first base station to which a secondary serving cell (SCell) to be added differs from a second base station to which a primary serving cell (PCell) belongs, a Random Access Response (RAR) message to the terminal.

Advantageous Effects of Invention

The data transmission method and apparatus of the present invention is advantageous in that a terminal is capable of increasing the probability of fast data transmission/reception through carrier aggregation.

The advantages of the present invention are not limited to the aforesaid, and other advantages not described herein be clearly understood by those skilled in the art from the descriptions below.

MODE FOR THE INVENTION

Detailed description of well-known functions and structures incorporated herein may be omitted to avoid obscuring the subject matter of the present invention. Exemplary embodiments of the present invention are described with reference to the accompanying drawings in detail. Prior to the description of the present invention, the LTE system and carrier aggregation are explained briefly.

Figure 1:
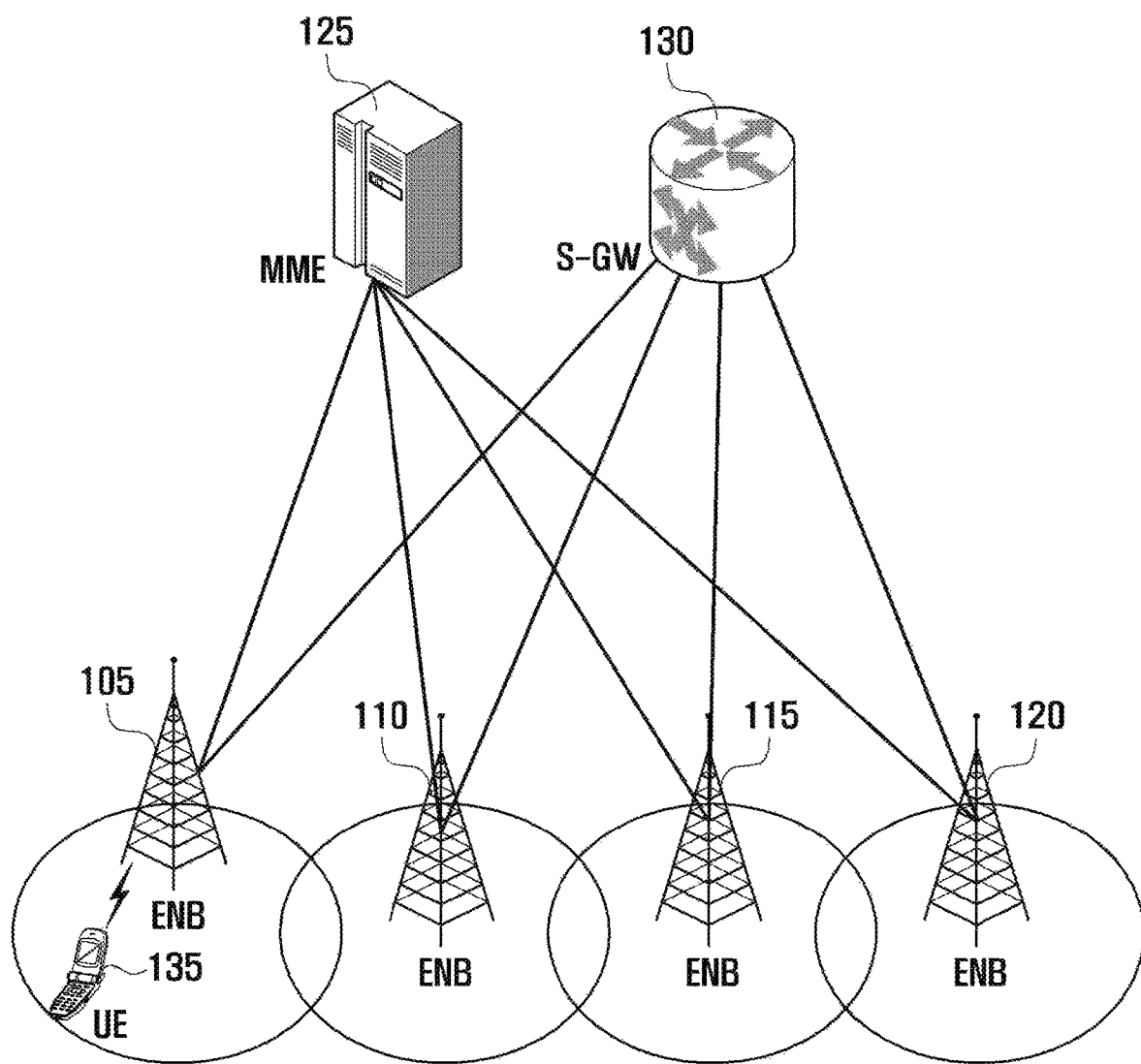
FIG. 1 is a diagram illustrating the architecture of an LTE system according to an embodiment of the present invention.

FIG. 1 is a diagram illustrating the architecture of an LTE system according to an embodiment of the present invention.

Referring to FIG. 1, the radio access network of the mobile communication system includes evolved Node Bs (eNBs) 105, 110, 115, and 120, a Mobility Management Entity (MME) 125, and a Serving-Gateway (S-GW) 130. The User Equipment (hereinafter, referred to as UE) 135 connects to an external network via eNBs 105, 110, 115, and 120 and the S-GW 130.

In FIG. 1, the eNBs 105, 110, 115, and 120 correspond to the legacy node Bs of the UNITS system. The eNBs allow the UE 135 to establish a radio channel and are responsible for complicated functions as compared to the legacy node B. In the LTE system, all the user traffic including real time services such as Voice over Internet Protocol (VoIP) are provided through a shared channel and thus there is a need of a device for scheduling data based on the state information such as buffer states, power headroom states, and channel states of the UEs, and the eNBs 105, 110, 115, and 120 are responsible for scheduling. Typically, one eNB controls a plurality of cells. In order to secure the data rate of up to 100 Mbps, the LTE system adopts Orthogonal Frequency Division Multiplexing (OFDM) as a radio access technology. Also, the LTE system adopts Adaptive Modulation and Coding (AMC) to determine the modulation scheme and channel coding rate in adaptation to the channel condition of the UE. The S-GW 130 is an entity to provide data bearers so as to establish and release data bearers under the control of the MME 125. The MME 125 is responsible for mobility management of UEs and various control functions and may be connected to a plurality of eNBs.

Figure 2:
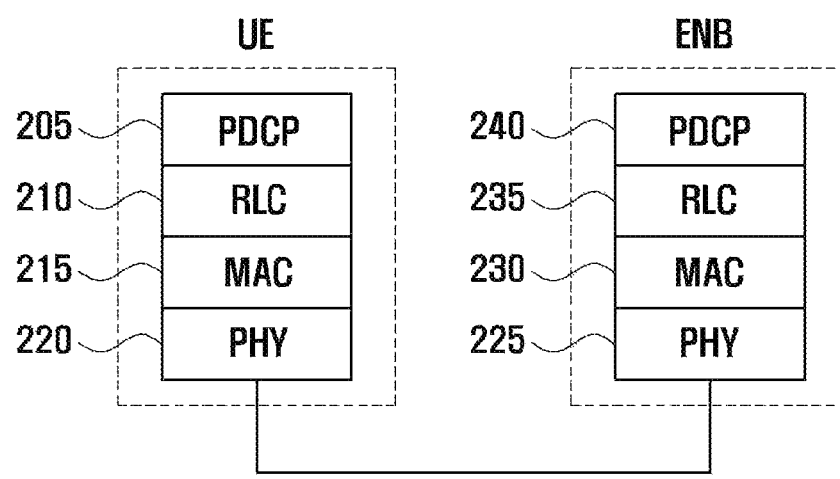
FIG. 2 is a diagram illustrating a protocol stack of the LTE system according to an embodiment of the present invention.

FIG. 2 is a diagram illustrating a protocol stack of the LTE system according to an embodiment of the present invention.

Referring to FIG. 2, the protocol stack of the LTE system includes Packet Data Convergence Protocol (PDCP) 205 and 240, Radio Link Control (RLC) 210 and 235, Medium Access Control (MAC) 215 and 230, and Physical (PHY) 220 and 225. The PDCP 205 and 240 is responsible for IP header compression/decompression, and the RLC 210 and 235 is responsible for segmenting the PDCP Protocol Data Unit (PDU) into segments in appropriate size for Automatic Repeat Request (ARQ) operation. The MAC 215 and 230 is responsible for establishing connection to a plurality of RLC entities so as to multiplex the RLC PDUs into MAC PDUs and demultiplex the MAC PDUs into RLC PDUs. The PHY 220 and 225 performs channel coding on the MAC PDU and modulates the MAC PDU into OFDM symbols to transmit over radio channel or performs demodulating and channel-decoding on the received OFDM symbols and delivers the decoded data to the higher layer.

Figure 3:
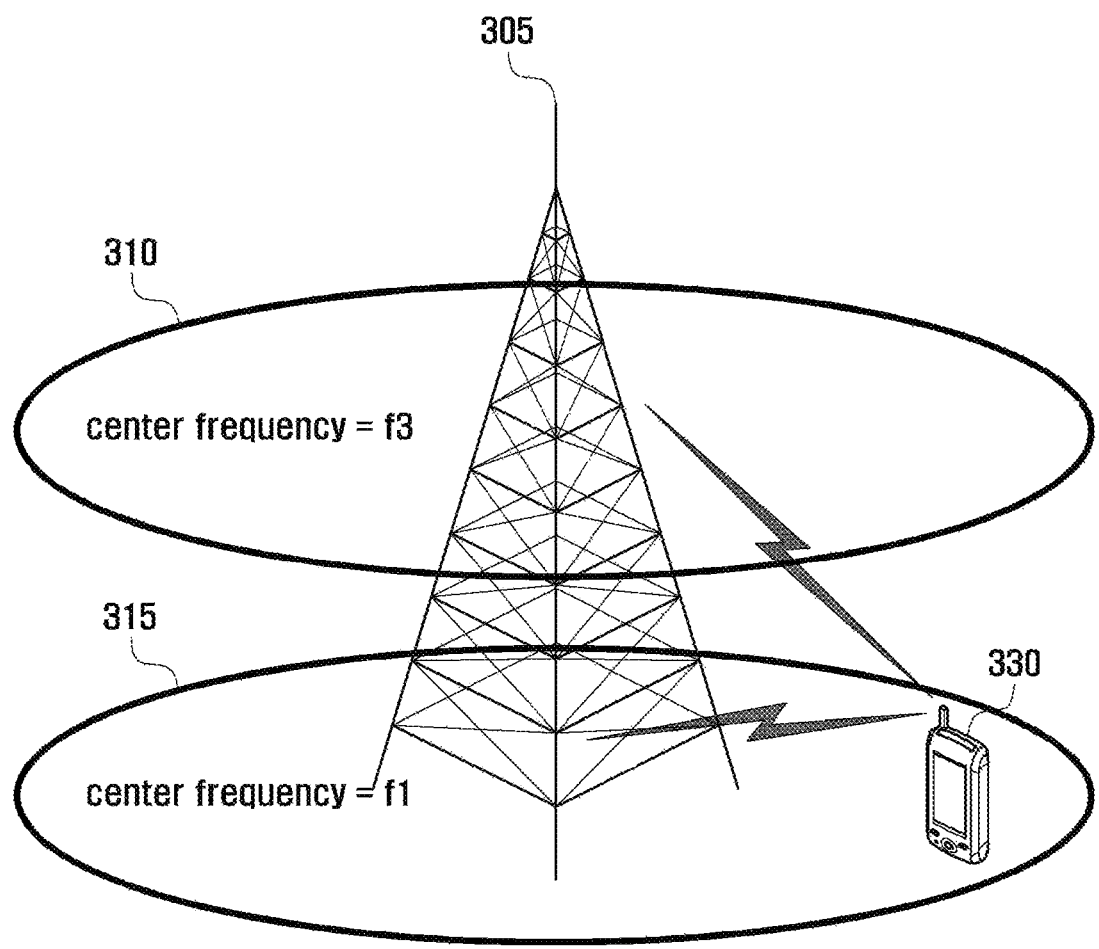
FIG. 3 is a diagram illustrating the concept of intra-eNB carrier aggregation.

FIG. 3 is a diagram illustrating the concept of intra-eNB carrier aggregation.

Referring to FIG. 3, an eNB transmits and receives signals through multiple carriers across a plurality of frequency bands. For example, the eNB 305 can be configured to use the carrier 315 with center frequency f1 and the carrier 310 with center frequency f3. If carrier aggregation is not supported, the UE 330 has to transmit/receive data using one of the carriers 310 and 315. However, the UE 330 having the carrier aggregation capability can transmit/receive data using both the carriers 310 and 315. The eNB can increase the resource amount to be allocated to the UE with the carrier aggregation capability in adaptation to the channel condition of the UE so as to improve the data rate of the UE 330. The technique of aggregating the downlink and uplink carriers respectively for transmission and reception at one eNB is referred to as intra-eNB carrier aggregation. In any case, however, there may be a need of aggregating the downlink/uplink carriers of different eNBs.

Figure 4:
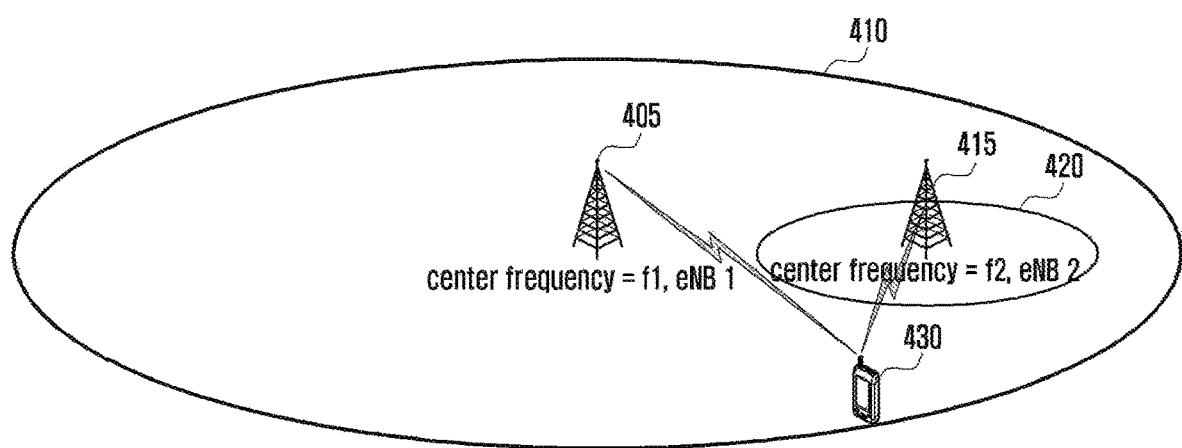
FIG. 4 is a diagram illustrating the concept of the inter-eNB carrier aggregation according to an embodiment of the present invention.

FIG. 4 is a diagram illustrating the inter-eNB carrier aggregation according to an embodiment of the present invention.

In the exemplary case of FIG. 4, the first eNB 405 uses the carrier 410 with center frequency f1 for transmission/reception, and the second eNB 415 uses the carrier 420 with center frequency f2 for transmission/reception. If the downlink carrier 410 with the center frequency f1 and the downlink carrier 420 with the center frequency f2 are aggregated, this means that carriers transmitted by more than one eNB are aggregated for one UE. This is referred to as inter-eNB Carrier Aggregation (CA) in the present invention.

The terms used frequently in the present invention are described hereinafter.

Assuming that a cell is configured to operate on one downlink carrier and one uplink carrier in the conventional concept, the carrier aggregation can be understood as if the UE communicates data via multiple cells. The carrier aggregation increases the peak data rate in proportion to the number of aggregated carriers.

In the following description, if a UE receives data through a certain downlink carrier or transmits data through a certain uplink carrier, this means to receive or transmit data through control and data channels provided in cells corresponding to center frequencies and frequency bands characterizing the carriers. In the present Invention, carrier aggregation may be expressed as configuring a plurality of serving cells with the use of terms such as primary cell (PCell), secondary cell (SCell), and activated serving cell. These terms are used as they are in the LTE mobile communication system and specified in TS36.331 and TS36.321 (December, 2011).

In the present invention, the serving cells controlled by the same eNB are defined as a set of serving cells. The set may is classified into one of a primary set and a non-primary set. The primary set is the set of serving cells controlled by the eNB controlling the PCell (primary eNB), and the non-primary set is the set of serving cells controlled by the eNB not controlling the PCell (non-primary eNB). The eNB may notifies the UE whether a serving cell belongs to the primary set or non-primary set in the process of configuring the corresponding serving cell. One UE can be configured with one primary set and one or more non-primary set.

In the following description, the terms 'primary set' and 'non-primary set' may be substituted by other terms to help understanding. For example, the terms 'primary set,' 'secondary set,' 'primary carrier group,' and 'secondary carrier group' may be used. Even in such a case, however, it should be notice that although the terms are different but used in the same meaning.

Figure 5:
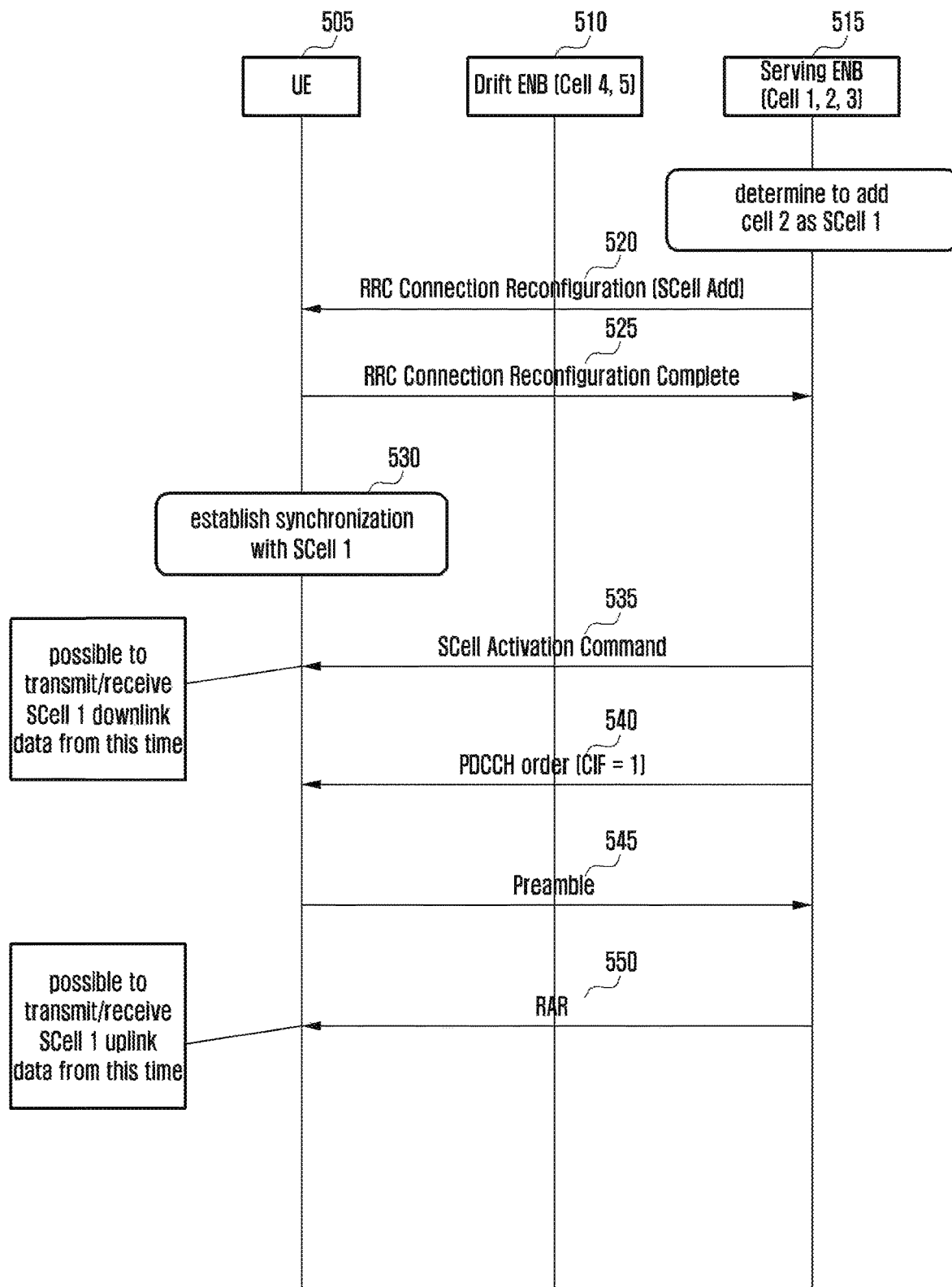
FIG. 5 is a signal flow diagram illustrating the operations of the UE and the eNB for configuring a SCell belonging to the primary set according to an embodiment of the present invention.

FIG. 5 is a signal flow diagram illustrating the operations of the UE and the eNB for configuring a SCell belonging to the primary set according to an embodiment of the present invention.

Referring to FIG. 5, in the mobile communication system made up of the UE 505, the first eNB 515, and the second eNB 510; the first, second, and third cells are controlled by the first eNB 515, and the fourth and fifth cells are control by the second eNB 510. Suppose that the PCell of the UE is the first cell and the first eNB 515 configures the second cell as an additional SCell to the UE 505. In the following description, the eNB 515 controlling the PCell, i.e. the primary set, is referred to as serving eNB. The eNB 510 which is not the serving eNB 515 and controls the serving cell of the UE is referred to as drift eNB. That is, the eNB 515 controlling the serving cells of the primary set is the serving eNB 515, and the eNB 510 controlling the serving cells of the non-primary set is the drift eNB 510. The serving eNB 515 and the drift eNB 510 may be referred to as the primary eNB 515 and non-primary eNB 510, respectively.

The serving eNB 515 sends the UE a control message called RRC Connection Reconfiguration including the information on the SCell to be added newly to the UE at step 520. The SCells to be added newly are managed by the serving eNB 515 directly and informations thereon, as shown in table 1, are included in the control message.

the TA timer expires, the UE determines that the uplink transmission synchronization of the corresponding TAG has broken and thus suspends uplink transmission until the next random access occurs.

The UE 505 sends a response message in reply to the control message at step 525. The UE 505 establishes forward/downlink synchronization with the second cell, i.e. serving cell 1, at step 530. The forward/downlink is of transmitting from the eNB to the UE, and the reverse/downlink is of transmitting from the UE to the eNB. In the present invention, the terms are used interchangeably. If the downlink synchronization is established in a certain cell, this means that the synchronization channel of the cell is acquired so as to check the downlink frame boundary.

The serving eNB 515 may send the UE 505 a command to activate the SCell 1 at a certain time when determined that the UE has completed the configuration of the SCell 1 at step 535. The SCell 1 activation command may be Activate/Deactivate MAC Control Element (A/D MAC CE) as a MAC layer control command. The control command is structured in the form of a bitmap of which the first bit corresponds to the SCell 1, the second bit to SCell 2, and the $n^{th}$ bit to SCell n. The bitmap may be the size of 1 byte. In this case, 7 indices, i.e. from 1 to 7, are used in such a way of mapping the second Least Significant Bit (LSB) to the SCell 1, the third LSB to SCell 2, and the last LSB or the Most Significant Bit (MSB) to SCell 7, without use of the first LSB.

The UE 505 starts monitoring the physical control channel (carrying Physical Downlink Control Channel (PDCCH) and uplink/downlink transmission resource allocation information) of the SCell after the elapse of a predetermined period from the receipt of the SCell 1 activation command

TABLE 1

| | Description |
|---|---|
| sCellIndex-r10 | Serving cell identifier of an integer with a predetermined size. Used in updating information on the corresponding serving cell in the future. |
| cellIdentification-r10 | Information for use in identifying the serving cell physically and composed of downlink center frequency and Physical Cell ID (PCI) |
| radioResourceConfigCommonSCell-r10 | Information on radio resource of service cell, e.g. downlink bandwidth, downlink Hybrid ARQ (HARQ) feedback channel configuration information, uplink center frequency information uplink bandwidth information. |
| radioResourceConfigDedicatedSCell-r10 | Information on UE-specific resource allocated in the serving cell, e.g. channel quality measurement reference signal structure information and inter-carrier scheduling configuration information. |
| Timing Advance Group (TAG) information | Information indicating TAG to which UE belongs. For example, it may be composed of TAG id and Timing Advance (TA) timer. If the UE belongs to P-TAG, this information may not be signaled. |

The Timing Advance Group (TAG) is a set of the serving cells sharing the same uplink transmission timing. A TAG is classified into one of Primary TAG (P-TAG) and Secondary TAG (S-TAG). The P-TAG includes the PCell, and S-TAG includes SCells without PCell). If a certain serving cell belongs to a certain TAG, this means that the uplink transmission timing of the serving cell is identical with those of the other serving cells belonging to the TAG and whether the uplink synchronization is acquired is determined by means of the Timing Advance (TA) timer of the TAG. The uplink transmission timing of a certain TAG is set through a random access process in a serving cell belonging to the TAG and maintained with the receipt of TA command. The UE starts or restart the TA timer of the corresponding TAG whenever the TA command for the corresponding TAG is received. If at step 535. If the SCell has been acquired synchronization and belonged to a TAG already, the downlink/uplink transmission starts since then. That is, if the downlink transmission resource allocation information is received on the PDCCH, the UE receives downlink data but ignores the uplink transmission resource information although it has been received. If the SCell belongs to a non-synchronized TAG, the UE waits for the receipt of 'random access command' on PDCCH in a SCell belonging to the TAG. The random access command is a value of a predetermined field of the uplink transmission resource allocation information to instruct the UE 505 to transmit a preamble in a serving cell. The Carrier Indicator Field of the random access command may carry the identifier of the serving cell for preamble transmission. The random access command instructing transmission of random access preamble is received from the serving cell 1 at step 540. As shown in FIG. 5, the CIF may indicate the serving cell 1 for preamble transmission.

The UE 505 monitors PDCCH of the PCell to receive Random Access Response (RAR) in reply to the preamble after transmitting the preamble through the SCell 1 at step 545. The RAR may include TA command and other control information. If the preamble is transmitted by the serving eNB 515, it is likely to be efficient to send the response in replay to the preamble through the PCell in various aspects. For example, since the RAR is received only through the PCell, it is possible to reduce the PDCCH monitoring load of the UE. Accordingly, the UE 505 monitors the PDCCH of the PCell to receiving RAR at step 550. If a valid response message is received in reply to the preamble, the UE 505 assumes that it is possible to transmit uplink signal transmission after the elapse of a predetermined period from that time point. For example, if the valid RAR is received at the subframe n, it is determined that the uplink transmission is possible from the subframe (n+m).

Figure 6:
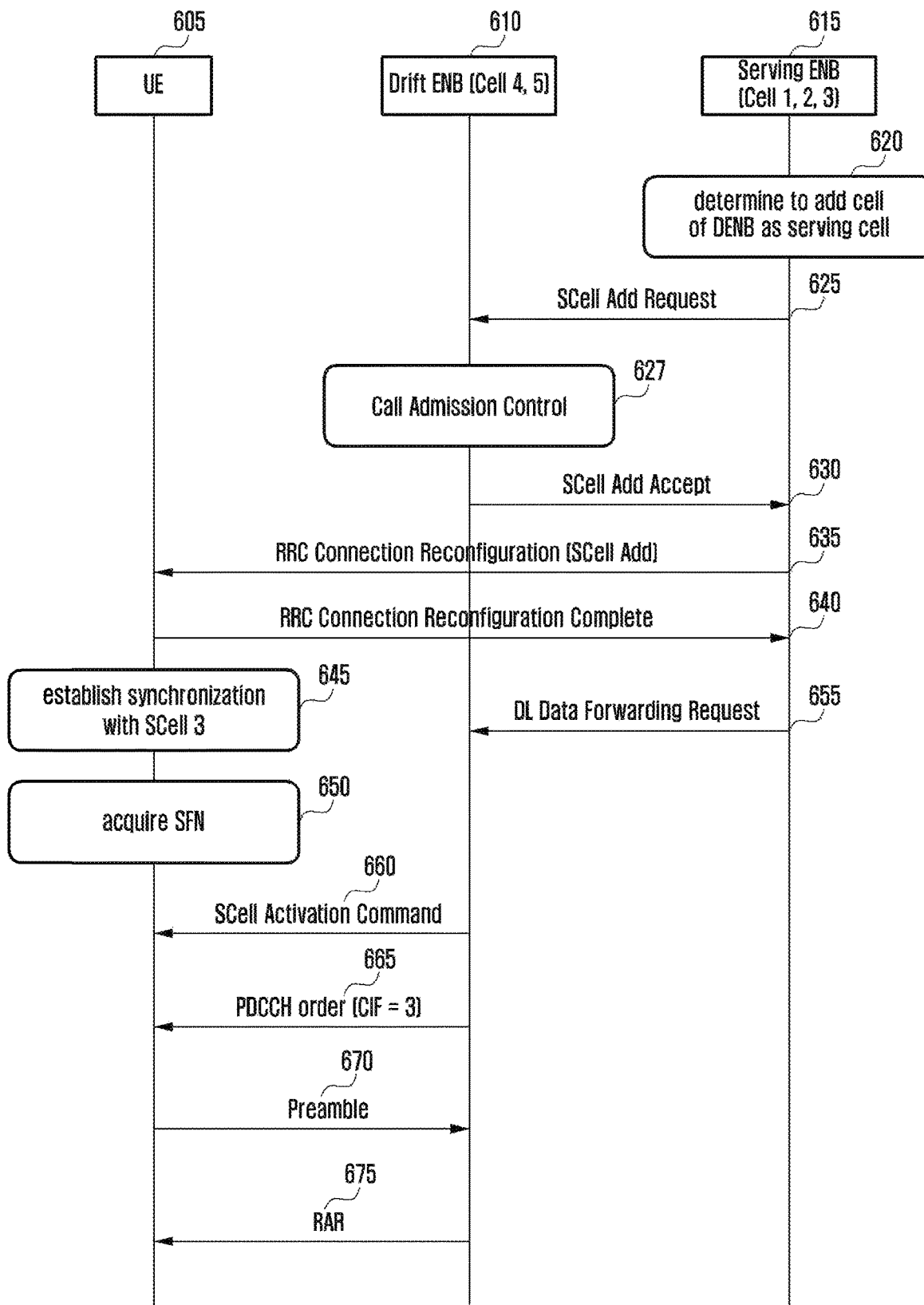
FIG. 6 is a signal flow diagram illustrating the operations of the UE and the eNB for configuring a SCell belonging to a non-primary set according to an embodiment of the present invention.

FIG. 6 is a signal flow diagram illustrating the operations of the UE and the eNB for configuring a SCell belonging to a non-primary set according to an embodiment of the present invention.

At step 620, the serving eNB 615 determines to add a SCell to the UE 605 at a certain time point. Particularly if the UE is located in the area of a cell controlled by the second eNB 610, the serving eNB 615 determines to add the cell controlled by the second eNB 610 as a SCell and sends the second eNB 610 a control message at step 625. The control message may include the information indicating that the second eNB 610 is not identical with the first eNB 615. Here, the second eNB 610 which is not identical with the serving eNB 615 and controls the serving cell of the UE is referred to as drift eNB (DENB) 610. The control message may include the information as shown in table 2.

TABLE 2

| Name | Description |
| --- | --- |
| SCell id information | Information related to identifiers of SCells to be configured by the drift eNB. Formed with one or more sCellIndex-r10. Determined by the serving cell and notified to the drift eNB to prevent the identifier in use by the serving eNB from being reused. The ranges of SCell id used by the serving eNB and the drift eNB may be defined separately. For example, SCell ids 1~3 may be defined in advance for use in serving eNB while SCell ids 4~7 for use in drift eNB. |
| TAG id information | Information related to identifier of TAG to be configured by the drift eNB. Defined by the serving eNB and notified to the drift eNB to prevent the identifier in used by the serving eNB from being reused. |
| UL scheduling information | Include priority informations of logical channels and logical channel group information configured to the UE. The drift information interprets the UE buffer state report information and performs uplink scheduling using this information. |
| Inform on bearer to be offloaded | It is preferred that the drift eNB processes the service requiring large amount data transmission/reception, e.g. FTP download. The serving eNB determines the bearer to be offload to the eNB among the bearers configured to the UE and sends the drift eNB the information on the bearer to be offloaded, e.g. DRB identifier, PDCP configuration information, RLC configuration information, required QoS information. |
| Call accept control information | The serving eNB provides the drift eNB with reference information for use in determining whether to accept SCell add request. For example, this information may include required data rate, expected uplink data amount, and expected downlink data amount. |

If a SCell add request control message is received at step 625, the drift eNB 610 determines whether to accept the request in consideration of the current load status at step 627. If it is determined to accept the SCell add request, the drift eNB 610 sends the serving eNB 615 a SCell add accept message at step 630. At this time, the drift eNB 610 generates a control message including the information as shown in table 3 and transmits the control message to the serving eNB 615.

TABLE 3

| Name | Description |
| --- | --- |
| SCellToAddMod | Information related to SCells configured by the drift eNB as follows. sCellIndex-r10, cellIdentification-r10, radioResourceConfigCommonSCell-r10, radioResourceConfigDedicatedSCell-r10, TAG-related information |
| PUCCH information for PUCCH SCell | At least one of SCells belonging to the non-primary set is configured with Physical Uplink Control Channel (PUCCH). Uplink control information such as HARQ feedback, Channel Status Information (CSI), Sounding Reference Signal (SRS), and Scheduling Request (SR) may be transmitted. Hereinafter, the SCell in which PUCCH is transmitted is referred to as PUCCH SCell. The PUCCH SCell identifier and PUCCH configuration information are the sub-informations of this information. |
| Information for data forwarding | Logical channel (or logical tunnel) for use in data exchange between the serving eNB and drift eNB. May include GPRS Tunnel Protocol (GTP) tunnel identifier for downlink data exchange and GTP tunnel identifier for uplink data exchange. |
| UE identifier | C-RNTI for use by UE in SCells of non-primary set. Hereinafter, referred to as C-RNTI_NP. |
| Bearer configuration information | Configuration information on the bearer to be offloaded. May include list of bearers accepted to be offloaded and per-bearer configuration information. If the bearer configurations are identical, it is possible to include only the list of bearers accepted. |

If the control message is received at step 630, the serving eNB 615 generates an RRC control message instructing the UE 605 to add a serving cell at step 635. The RRC control message may include the information as shown in table 4.

TABLE 4

| Name | Description |
| --- | --- |
| SCellAddMod | This may include the information transmitted from the drift eNB to the serving eNB as it was. That is, this is identical with SCellAddMod in table 3. The SCellAddMod is included per SCell and is sub-information of SCellAddModList. |
| PUCCH information for PUCCH SCell | This may include the information transmitted from the drift eNB to the serving eNB as it was. That is, this is identical with PUCCH information for PUCCH SCell in table 3. |
| Non-primary SCell List | This is the information on the SCells belonging to the non-primary set among the SCells to be configured. This may be the identifiers of the SCells or the TAGs belonging to the non-primary set. |
| UE identifier | This is C-RNTI for use by the UE in the serving cell of the non-primary set. |
| Offload bearer information | This is the information on the bearers to be processed by the drift eNB. This is the information on the bearers to be transmitted/received through the serving cells of the non-primary set in view of the UE and, if the bearer lists and bearer configurations are different, may include bearer configuration information. |

The RRC control message of step 635 may include the configuration information of a plurality of SCells. The serving cells of the primary and non-primary sets may be configured together. For example, if the second to fifth cells are configured to the UE having the first cell as the PCell, the informations thereon may be arranged in the RRC control message in various orders.

Figure 7:
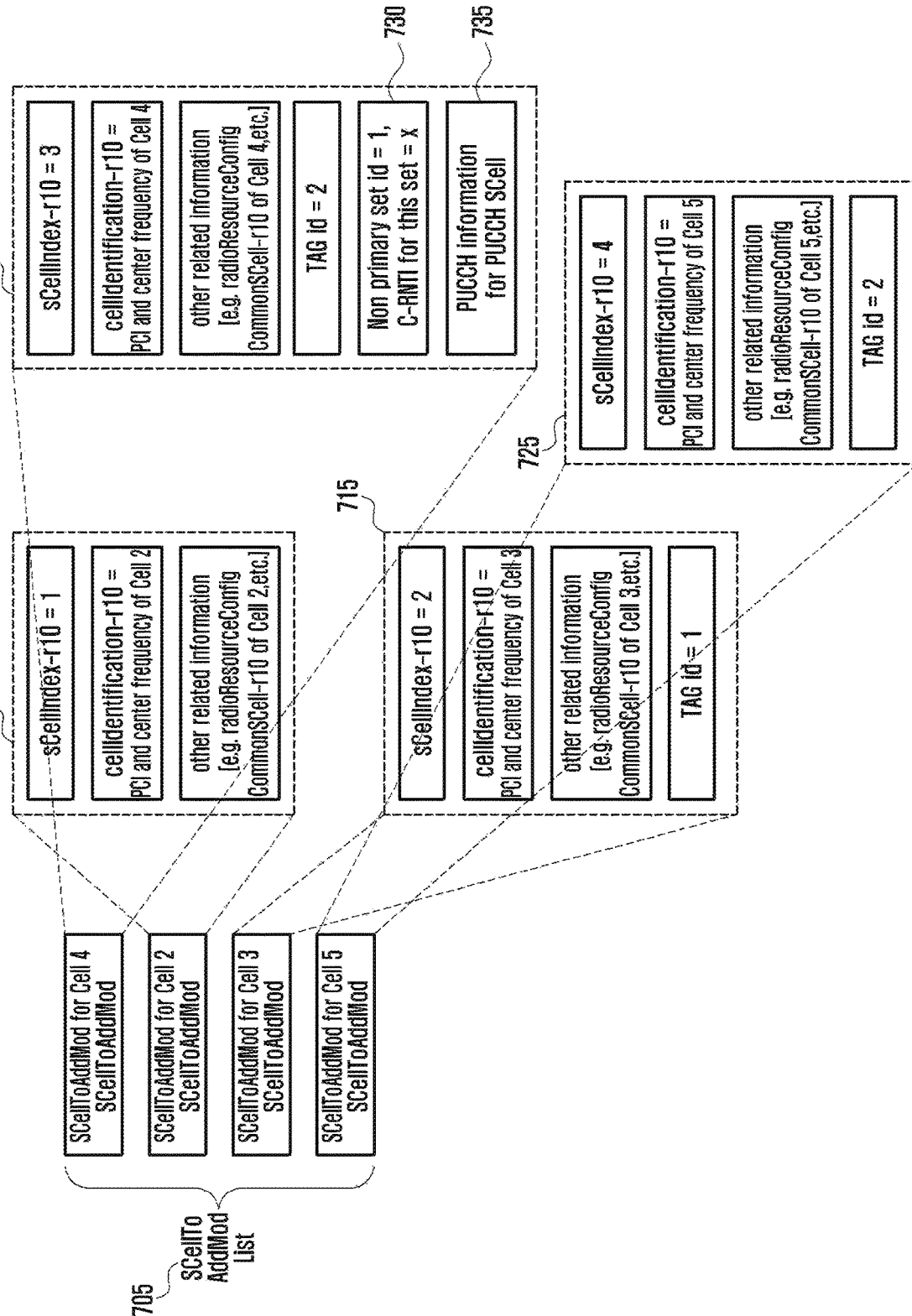
FIG. 7 is a diagram illustrating a structure of the RRC control message including SCell configuration information according to an embodiment of the present invention.

FIG. 7 is a diagram illustrating a structure of the RRC control message including SCell configuration information according to an embodiment of the present invention.

Referring to FIG. 7, the first and second cells have the same uplink transmission timing and forms the P-TAG, the third cell forms the S-TAT 1, and the fourth and fifth cells form the S-TAG 2.

The RRC control message may include SCellToAddModList 705. The SCellToAddModList may include SCellToAddMod 710 for the second cell, SCellToAddMod 715 for the third cell, SCellToAddMod 720 for the fourth cell, and SCellToAddMod 725 for the fifth cell.

The SCellToAddMod 710, 715, 720, and 725 may include specific information or not depending on the characteristic of the corresponding SCell.

If the SCell belongs to the P-TAG, i.e. if it has the same uplink transmission timing as the PCell, the corresponding SCellToAddMod may not include the information on the TAG. For example, the SCellToAddMod 710 for the second cell does not include the information on the TAG. The SCellToAddMod 715, 720, and 725 for the SCells belonging to the rest non—P-TAGs may include the TAG identifiers and TA timer values of the TAGS to which the corresponding SCells belong.

The information on at least one of the cells belonging to the non-primary set may include the non-primary set information 730, e.g. non-primary set identifier and C-RNTI for use by the UE in the non-primary set. In the example of FIG. 7, the SCellToAddMod 720 for the fourth cell includes the non-primary set information 730. Accordingly, whether the corresponding cell belongs to the non-primary set can be determined based on the non-primary set information 730. The information on one of the cells belonging to the non-primary set includes PUCCH configuration information 735. In the example of FIG. 7, the SCellToAddMod 720 for the fourth cell includes the PUCCH configuration information 735.

To the SCell which belongs to the non-primary set but has no non-primary set information, the non-primary set information of the SCell having the same TAG id is applied. In the exemplary case of FIG. 7, although the information on the fifth cell includes no non-primary set information, the UE can check that the fifth cell belongs to the non-primary set based on the non-primary set information of the fourth cell having the same TAG id. The UE can use the non-primary set identifier and C-RNTI of the fourth cell for identifying the fifth cell.

Figure 8:
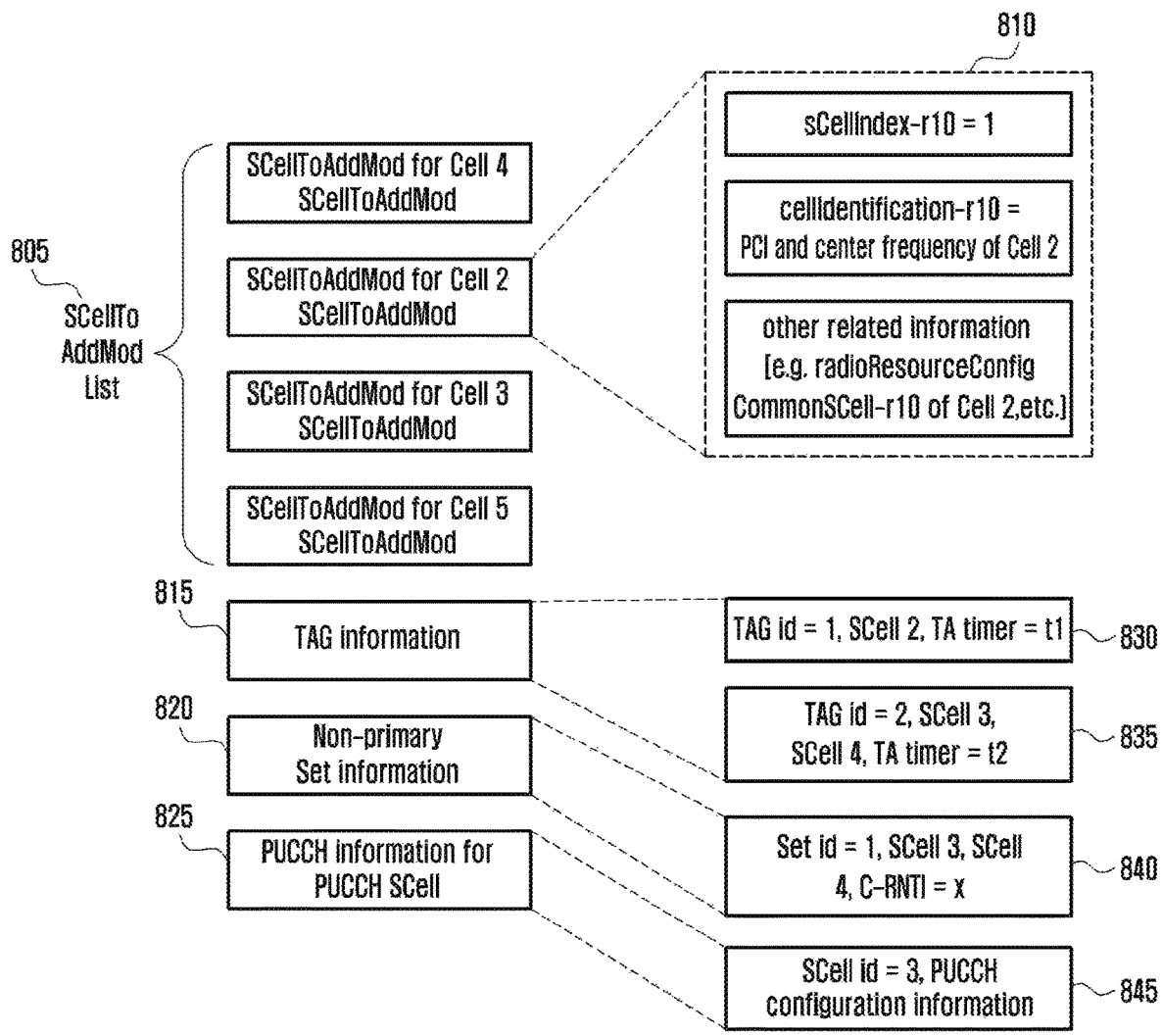
FIG. 8 is a diagram illustrating a structure of the RRC control message including SCell configuration information according to another embodiment of the present invention.

FIG. 8 is a diagram illustrating a structure of the RRC control message including SCell configuration information according to another embodiment of the present invention.

Referring to FIG. 8, the TAG information and non-primary set information may be included at a position not in the SCellToAddMod.

The RRC control message may include SCellToAddModList 805. The SCellToAddModList may include SCellToAddMod 810 for the second cell, SCellToAddMod for the third cell, SCellToAddMod for the fourth cell, and SCellToAddMod for the fifth cell. FIG. 8 shows only the SCellToAddMod 810 for the second cell for explanation convenience. The SCellToAddMod 810 may include the same types of informations. That is, every SCellToAddMod may include the information such as sCellIndex-r10, cellIdentification-r10, and radioResourceConfigCommonSCell-r10.

The TAG information 815, the non-primary set information 820, and the PUCCH configuration information of PUCCH SCell 825 may be included separately.

The TAG information 815 may include the TAG identifiers, identifiers of the SCells forming the TAG, and TA timer value. As shown in FIG. 8, the TAG information 815 may include the information 830 notifying that the TAG having the TAG identifier 1 includes the SCell 2 and that the TA timer is set to the value t1. The TAG information 815 also may include the information 835 notifying that the TAG having the TAG identifier 2 includes the SCell 3 and SCell 4 and that the TA timer is set to the value t2.

The non-primary set information 820 may include the per-non-primary set identifiers, identifiers of the serving cells included in the set, and C-RNTI for use in the corresponding set. For example, the information 840 indicating that the non-primary set having the set identifier 1 includes the SCell 3 and SCell 4 and uses the C-RNTI x. The primary set information is determined according to the following rule without explicit signaling.

<Primary Set Information Determination Rule>

The serving cells belonging to the primary set include the PCell and the SCells not belonging to any non-primary set. The C-RNTI to be use in the primary set may be the C-RNTI in use by the current PCell.

The non-primary set information 820 may include the TAG identifier other than the SCell identifier. This is possible under the assumption that the set and TAG are formed such that one TAG is not formed across multiple sets. For example, the non-primary set configuration information 820 may include the information indicating the TAG id 2 instead of the information indicating the SCell 3 and SCell 4 in order for the UE to determine that the SCell 3 and SCell 4 having the TAG id 2 belong to the non-primary set.

The PUCCH SCell's PUCCH configuration information 825 may be made up of non-primary set identifier, PUCCH SCell identifier, and PUCCH configuration information. Each non-primary set has one PUCCH SCell. The CSI information for the serving cells belonging to the non-primary set and HARQ feedback information may be transmitted on the PUCCH configured to the PUCCH SCell.

Depending on the embodiment, the PUCCH SCell can be determined according to a predetermined rule without signaling PUCCH SCell identifier explicitly in the PUCCH SCell's PUCCH configuration information 825. For example, the SCell corresponding to the first SCellToAddMod of the SCellToAddModList 805 may be assumed as the PUCCH SCell. In the embodiment of FIG. 8, the SCell corresponding to the first SCellToAddMod of the SCellToAddModList 805 may be determined as the PUCCH SCell. Also, the SCell having the highest or lowest SCell identifier among the SCells of which information includes the SCellToAddMod information in the corresponding RRC control message may be determined as the PUCCH SCell. Such an implicit determination method can be used under the assumption that only one non-primary set exists.

Returning to FIG. 6, the UE 650 sends the serving eNB 615 a response message at step 640 and establishes downlink synchronization with the newly configured SCells at step 645. The UE 650 acquires System Frame Number (SFN) of the PUCCH SCell among the newly configured SCells at step 650. The SFN is acquired in the process of receiving the system information, i.e. Master Information Block (MIB). The SFN is an integer incrementing by 1 at every 10 ms in the range of 0 to 1023. The UE 605 checks the PUCCH transmission timing of the PUCCH SCell based on the SFN and PUCCH configuration information.

Afterward, the UE waits until the SCells are activated. If downlink data or a predetermined control message instructing to activate SCell is received from the serving eNB 615 at step 655, the drift eNB 610 starts a procedure of activating the SCells.

The drift eNB 610 sends the UE 605 the A/D MAC CE instructing to activate the SCell, e.g. SCell 3, at step 660 and, if the MAC CE is received at the subframe n, the UE 605 activates the SCell at subframe (n+m1). However, since the uplink synchronization of the PUCCH SCell is not acquired yet at the subframe (n+m1), both the downlink and uplink transmission/reception are not possible although the SCell has been activated. That is, the UE 605 monitors PDCCH of the SCell but ignores the downlink/uplink resource allocation signal although it is received.

The drift eNB 610 sends the UE 605 a random access command to establish uplink synchronization with the PUCCH SCell at step 665. The random access command includes Carrier Indicator Field (CIF) carrying the identifier of the serving cell for preamble transmission.

The UE 605 initiates random access procedure in the PUCCH SCell using a dedicated preamble indicated in the random access command. That is, the UE 605 sends a preamble through the SCell at step 670 and monitors PDCCH to receive RAR in response thereto. If the UE transmits the preamble in the primary set, the RAR is transmitted through the PCell. Otherwise if the preamble is transmitted in the non-primary set, the UE monitors PDCCH of the SCell in which the preamble has been transmitted or the PUCCH SCell to receive RAR. This is because there is a need of extra information exchange between the drift eNB 610 and the serving eNB 615 to process the RAR in the PCell. The RAR may be received with the C-RNTI to be used by the UE 605 in the non-primary set. It is more efficient to transmit the response message with the C-RNTI because the UE 605 also has been allocated the C-RNTI and there is no probability of malfunctioning caused by collision due to the use of the dedicated preamble (i.e. since the eNB knows the UE to which the RAR has to be transmitted based on the dedicated preamble). If the valid response message is received through the SCell in which the preamble has been transmitted or the PUCCH SCell, the UE 605 adjusts the uplink transmission timing of the PUCCH SCell and the TAG to which the PUCCH SCell based on the TA command of the response message and activates uplink at a predetermined time point. If the valid TA command or the valid random access response message is received at the subframe n, the predetermined timing becomes the subframe (n+m2). Here, m2 is a predetermined integer.

Figure 9:
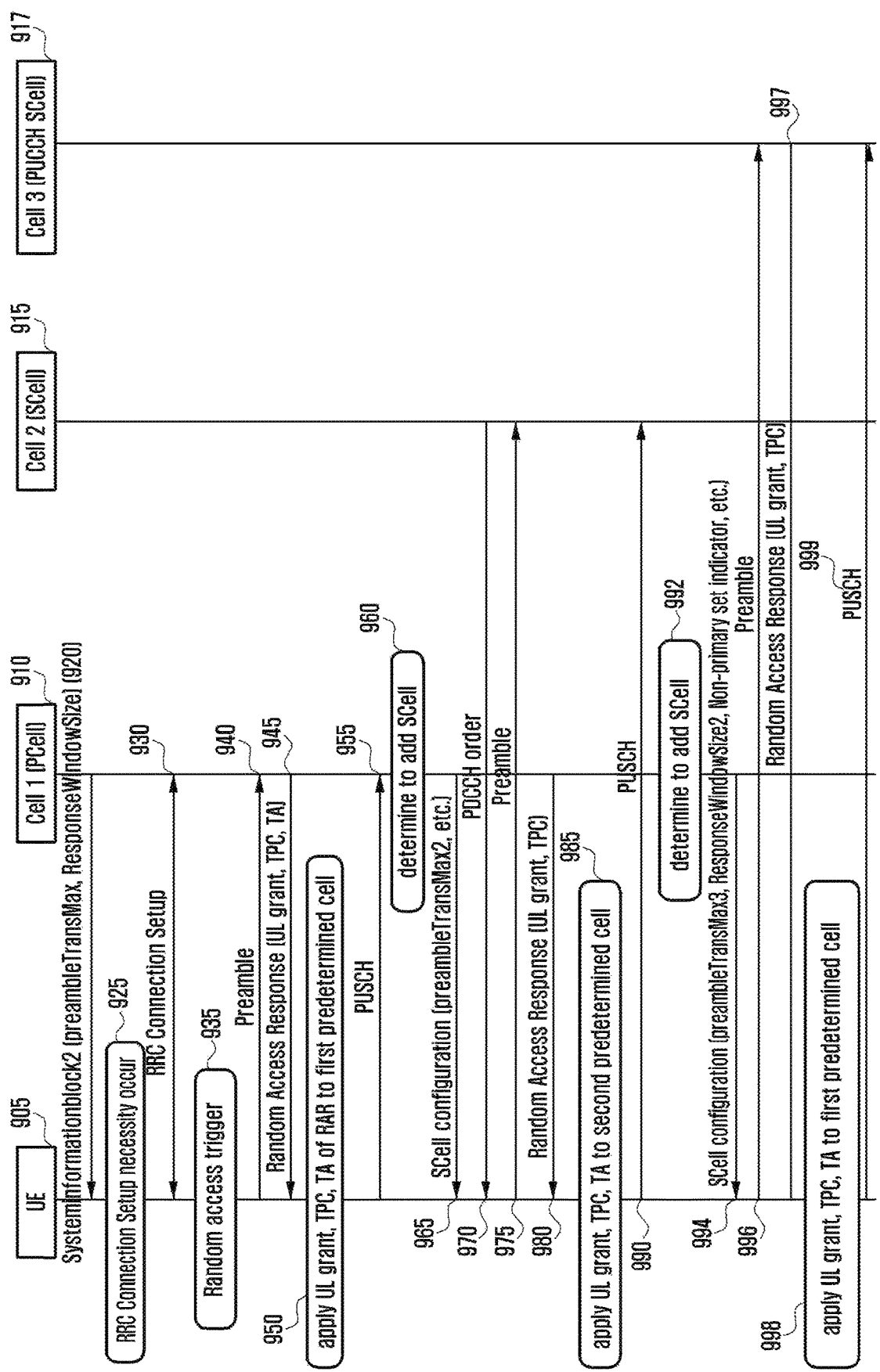
FIG. 9 is a flowchart illustrating a random access procedure for inter-eNB carrier aggregation mode according to an embodiment of the present invention.

FIG. 9 is a flowchart illustrating a random access procedure for inter-eNB carrier aggregation mode according to an embodiment of the present invention.

Referring to FIG. 9, the UE 905 performs a random access procedure for various reasons. The UE 905 may transmit the preamble in the PCell 910 or SCell 915 of the primary set or the PUCCH SCell 920. The subsequent process is determined depending on the type of the serving cell in which the preamble has been transmitted. Detailed description thereon is hereinafter.

The UE 905 without RRC connection selects the first cell 910 among a plurality of available cells according to a predetermined rule at step 920. The system information is provided to a plurality of unspecific UEs by means of the control message, i.e. System Information Block (SIB). The SIB2 may include the following informations necessary for the UE 905 to perform random access in the corresponding cell.

The following informations are related to random access.

Maximum number of preamble transmissions (preambleTransMax): This is the maximum number of preamble transmissions before starting a predetermined operation while the UE performs the random access operation. The predetermined operation may be RRC Connection Reestablishment. The eNB sets preambleTransMax to an appropriate value so as to prevent preamble transmission from being repeated infinitely.

random access response window size (ra-ResponseWindowSize): The random access response window (ra-window) is a time period for monitoring PDCCH to receive the RAR at the UE which has transmitted the preamble. If no valid RAR is received before the expiry of the ra-window, the UE retransmit the preamble.

random access transmission resource information: This includes information on the subframe capable of carrying the preamble transmitted by the UE, frequency resource information, and preamble format information.

The UE 905 takes an action required for the UE without RRC connection (i.e. UE in idle state) in the first cell 910, e.g. action of monitoring the paging channel and measuring neighbor cells. If RRC connection setup necessity occurs at a certain time point (e.g. if the UE 905 receives paging or data or control message to be transmitted by the UE 905 occurs) at step 925, the UE 905 performs RRC connection setup procedure with the first cell 910. In the RRC connection setup procedure, a Signaling Radio Bearer (SRB) for RRC control message exchange between UE and eNB and Data Radio Bearer (DRB) for user data exchange between UE and eNB are configured, and the UE 905 and the eNB uplink and downlink data using the radio bearers.

If the random access is triggered by a certain reason at a certain timing, e.g. if the eNB instructs the UE 905 to initiate random access or if the UE 905 needs to request the eNB for transmission resource, at step 935; the UE 905 determines the time period for transmitting the preamble based on the random access-related information acquired from the SIB 2 at step 920 and transmits the preamble at step 940. The UE 905 transmits the preamble at uplink subframe n and starts the ra-window at downlink subframe n+m. The UE 905 monitors to receive the response message during the timer period defined as ra-window. Here, m is a value defined in the standard, e.g. 2 or 3. The UE 905 monitors to determine whether the identifier mapped to the transmission resource used for transmitting the preamble is allocated and, if the identifier is scheduled, receives the RAR at step 945 to check whether the identifier mapped to the transmitted preamble is included in the header of the data at step 945. If the identifier mapped to the preamble transmitted by the UE 905 is included in the header of the data, the UE 905 memorizes uplink transmission resource allocation information (UL grant), Transmission Power Control (TPC), and UL Timing Advance (TA).

Depending on the embodiment, if no valid RAR message is received during the ra-window, the UE 905 retransmits the preamble. The number of preamble retransmission is limited by preambleTransMax and, if the random access is not completed even though the preamble has been transmitted as many as preambleTransMax, determines any problem has occurred in uplink and thus initiates RRC connection reestablishment procedure.

The UE applies the UL grant, TPC, and TA included in the valid RAR message to the uplink transmission in the first serving cell at step 950. The UE adjusts the transmission start time of the uplink subframe n of the first serving cell to precede the start time (start boundary) of the downlink subframe of the first serving cell as much as TA, increases or decreases the uplink transmit power of the first serving cell as much as indicated by the TPC, and selects the transmission resource of the first serving cell as the resource for the uplink transmission. Next, the UE performs uplink transmission in the serving cell 910 through which the RAR has been received at step 955. The UE 905 selects the serving cell 910 through which the RAR has been received as the first serving cell 910.

In the situation where carriers are not aggregated, where only one serving cell having uplink exists although the carriers are aggregated, or where only one cell allowed for random access exists although plural serving cells having uplink, the UE 905 selects the cell 910 through which the RAR has been received as the serving cell to apply the information carried in the RAR.

The UE 905 performs Physical Uplink Shared Channel (PUSCH) transmission by applying the UL grant of the RAR in the first cell 910 at step 955. Typically, synchronous HARQ process is applied to the PUSCH transmission. If an HARQ NACK is received in the synchronous HARQ transmission process, retransmission is performed using the same transmission resource as before. The UE 905 may perform HARQ transmission maxHARQ-Tx times and, if HARQ transmission fails even after attempts of maxHARQ-Tx times, stops PUSCH transmission. The maxHARQ-Tx is set to prevent the PUSCH transmission for one MAC PDU from being repeated infinitely and determined depending on how the eNB scheduler has considered the channel condition of the UE 905 and delay sensibility of the service configured to the UE 905. Total 5 types of maxHARQ-Tx parameters can be provided to the UE 905.

First maxHARQ-Tx: This is a parameter acquired by the UE through systeminformationblock2 of the serving cell.

Second maxHARQ-Tx: This is a parameter acquired by the UE through a dedicated RRC control message such as RRCConnectionSetup message in the RRC connection setup procedure with the PCell.

Third maxHARQ-Tx: This is a parameter acquired through a dedicated control message such as RRCConnectionReconfiguration message in the procedure of adding SCell of the primary cell configured with uplink.

Fourth maxHARQ-Tx: This is a parameter acquired through a dedicated RRC control message such as RRCConnectionReconfiguration message in the procedure of adding a non-primary set cell, e.g. PUCCH cell, and applied to the PUSCH transmission fulfilling a predetermined condition. The predetermined condition may be of PUSCH transmission related to the preamble selected by the UE.

Fifth maxHARQ-Tx: This is a parameter acquired through a dedicated RRC control message such as RRCConnectionReconfiguration message in the procedure of adding a non-primary set SCell, e.g. PUCCH SCell, and applied to the PUSCH transmission fulfilling a predetermined condition. The predetermined condition may be of PUSCH transmission related to the dedicated preamble (preamble indicated by the eNB but not selected by the UE) or normal PUSCH transmission other than the PUSCH transmission related to the random access procedure.

If the preamble transmitted at step 940 is the dedicated preamble, the UE 905 performs PUSCH transmission by applying the second maxHARQ-Tx at step 955. Otherwise if the preamble transmitted at step 940 is the random preamble selected by the UE 905, the UE 905 performs PUSCH transmission by applying the first maxHARQ-Tx. If the dedicated preamble has been used, this means that the eNB has known the UE 905 at the time when the PUSCH has been transmitted and, otherwise if the random preamble has been used, this means that the eNB has not known the UE 905 at the time when the PUSCH has been transmitted. The UE 905 applies the third maxHARQ-Tx when transmitting PUSCH based on the UL grant acquired in the random access procedure of the primary set SCell. In the case of transmitting PUSCH based on the UL grant for the non-primary set SCell or the UL grant acquired in the random access procedure of the PUSCH SCell, if the transmitted preamble is the random preamble, the UE 905 applies the fourth maxHARQ-Tx and, otherwise if the transmitted preamble is the dedicated preamble, the fifth maxHARQ-Tx. The second maxHARQ-Tx and the third maxHARQ-Tx may have the same value. The maxHARQ-Tx is also applied to the normal PUSCH transmission as well as the PUSCH transmission in the random access procedure. The UE may operate as follows in transmitting the PUSCH through a certain serving cell.

If a PUSCH transmission time arrives in a certain serving cell, the UE operates to determine the maxHARQ-Tx to be applied.

If the PUSCH transmission is triggered by the UL grant of the RAR received in the PCell and if the random access preamble is transmitted in the PCell, maxHARQ-Tx 1 is applied.

If the PUSCH transmission is triggered by the UL grant of the RAR received in the PCell and if the dedicated preamble is transmitted in the PCell, maxHARQ-Tx 2 is applied.

If the PUSCH transmission is triggered by the UL grant of the RAR received in the PCell and if the preamble is transmitted in the SCell, maxHARQ-Tx 2 is applied.

If the PUSCH transmission is triggered by the UL grant of the RAR received in the SCell and if the random preamble is transmitted in the SCell, maxHARQ-Tx 4 is applied.

If the PUSCH transmission is triggered by the UL grant of the RAR received in the SCell and if the dedicated preamble is transmitted in the SCell, maxHARQ-Tx 5 is applied.

If the PUSCH transmission is triggered by normal UL grant (i.e. UL grant received through PDCCH) and for PCell, maxHARQ-Tx 2 is applied.

If the PUSCH transmission is triggered by normal UL grant (i.e. UL grant received through PDCCH) and for primary set SCell, maxHARQ-Tx 2 is applied (i.e. maxHARQ-Tx identical with that applied to PUSCH transmission in PCell is applied).

If the PUSCH transmission is triggered by normal UL grant (i.e. UL grant received through PDCCH) and for non-primary set SCell, maxHARQ-Tx 5 (i.e. maxHARQ-Tx different from that applied to PUSCH transmission in PCell) is applied.

The UE 905 performs downlink data reception and uplink data transmission with the first cell 910.

If the data amount of the UE 905 increases, the eNB controlling the first cell 910 may determines to add a SCell to the UE 905 so as to increase the data rate. The eNB determines to add a primary set SCell 915 to the UE at step 960.

If the location of the transmission/reception device of the SCell 915 to be added newly differs from the location of the transmission/reception device of the PCell 910, e.g. if the PCell 910 is a macro cell and if the SCell 915 is an cell formed with an RRH, the eNB provides the UE 905 with the SCell configuration information along with the information necessary for performing random access in the SCell 915 at step 965. At this time, the random access-related information for use in the SCell 915 is provided partially other than wholly so as to be used along with the information used in the PCell 910. For example, the preambleTransMax and random access transmission resource information for use in the SCell 915 are provided to be used along with the ra-ResponseWindowSize used in the PCell 910. The preambleTransMax and random access transmission resource information are the parameters for use in controlling preamble transmission and set preferably to the values dedicated to the serving cell in which the preamble is to be transmitted. Whereas, the ra-ResponseWindowSize is associated with the serving cell through which the RAR is to be received other than the serving cell through which the preamble has been transmitted and thus set preferably to the value defined in the PCell 910. For explanation convenience, the preambleTransMax of the primary set SCell 915 is referred to as preambleTransMax2.

The UE 905 receives a PDCCH order instructing to initiate random access from the SCell 915 as the second cell at step 970. The PDCCH order is a command instructing the UE 905 to initiate random access procedure in a predetermined serving cell and specified in TS36.211 in detail. The PDCCH order is transmitted in Downlink Control Information (DCI) format 1A, and CRC is scrambled with the C-RNTI of the corresponding UE. Each filed is coded as shown in table 5.

TABLE 5

| PDCCH field | Size (bit) | value |
| --- | --- | --- |
| Flag for format0/format1A differentiation | 1 | 1 |
| Localized/Distributed VRB assignment flag | 1 | 0 |
| RB assignment | 5~13 | all 1 |
| Preamble index | 6 | Index of preamble to be used by UE in random access procedure |
| PRACH mask index | 4 | PRACH mask index to be applied to random access procedure |
| remaining | 3 or 4 | all 0 |

Upon receipt of the PDCCH order at subframe [n], the UE 905 applies the preamble indicated by means of the preamble index to transmit the preamble in the second cell 915 at subframe [n+x1]. The subframe number x1 is an integer greater than a predetermined x and is a value corresponding to the first valid PRACH occasion since [n+x]. x denotes the time required for the UE to take an action for transmitting the preamble and is set to a relatively large value in consideration of a low-end UE having low processing capability. This parameter is set to 6 in the current standard. The valid PRACH occasion denotes the PRACH occasion allowed for the UE to transmit preamble among the PRACH occasions defined based on the PRACH configuration information and is determined based on the PRACH mask index. The PRACH mask index has been specified in TS36.321.

After transmitting the random access preamble in the SCell, the UE 905 monitors the PDCCH of the PCell 910 to determine whether RAR is received during the ra-window. Here, the window size may be set to the ra-ResponseWindowSize of the PCell 910 which has been acquired at step 920.

Typically, if the preamble has been transmitted through a SCell, it is intuitive to receive the RAR through the SCell. The RAR is addressed to a specific identifier called RA-RNTI unlike the user data. Accordingly, in order to receive the RAR in the SCell, the UE has to monitor to receive the RA-RNTI as well as C-RNTI in the SCell, and this causes a problem of increasing complexity of the UE 905. However, if the RAR reception is restricted to the PCell, it is necessary just to monitor to receive the C-RNTI in the SCell, resulting in avoidance of increase of the complexity of the UE. Accordingly, although the UE 905 has transmitted the preamble in the SCell 915 at step 975, the UE 905 monitors the PDCCH to receive the RAR transmitted with the RA-RNTI of the PCell 910 during the ra-window defined as ra-ResponseWindowSize for the PCell 910. If no valid RAR is received, the UE 905 retransmits the preamble in the SCell 915. If it fails completing the random access even after a predetermined number of retransmission attempts, the UE 905 stop transmitting preamble so as to prevent uplink transmission from being performed.

If a valid RAR is received through the PCell 910 at step 980, the UE 905 applies the UL grant, TPC, and TA included in the valid random access response message to the uplink transmission in the second serving cell 915 at step 985. The second serving cell 915 is the serving cell 915 through the UE has transmitted the preamble other than the serving cell 910 through which the RAR has been received. The UE 905 adjusts the transmission start time of uplink subframe n to precede the start time (start boundary) of the downlink subframe n as much as TA. The UE also increases or decreases the uplink transmit power in the second cell 915 as much as indicated by the TPC. The RAR may include a 3-bit TPC as shown in table 6.

TABLE 6

| TPC Command | Value (in dB) |
| --- | --- |
| 0 | −6 |
| 1 | −4 |
| 2 | −2 |
| 3 | 0 |
| 4 | 2 |
| 5 | 4 |
| 6 | 6 |
| 7 | 8 |

Typically, the TPC relates to the PUSCH transmit power control of the serving cell 910 through which the RAR has been received. However, the UE may perform random access in several cells and, if the UE has transmitted the preamble through the SCell 915, the TPC is of PUSCH transmit power control of the serving cell 915 through which the preamble has been transmitted other than the serving cell 910 through which the RAR has been received.

The UE 905 selects the transmission resource of the second serving cell 915 as the resource for uplink transmission. Next, the UE perform uplink transmission at step 990.

As described above, if carriers are not aggregated, if only one serving cell having uplink exists although the carriers are aggregated, or if only one cell allowed for random access exists although plural serving cells having uplink, the serving cell to which the information included in the RAR is applied is the cell through which the RAR is received, i.e. the PCell 910. Otherwise if the preamble is transmitted through the SCell 915 or if the random access is performed in the SCell 915 as well as the PCell 910, and if information included in the RAR is applied to the cell 910 through which the RAR has been received, the goal of the random access procedure may not be achieved. The UE 905 which has one serving cell allowed for random access maintains its operation because the convention operation of applying the information included in the RAR to the serving cell through which the RAR has been received, but the UE 905 having multiple serving cell allowed for random access applies the information included in the RAR to the serving cell 915 through which the preamble has been transmitted instead of applying the information included in the RAR to the serving cell 910 through which the RAR has been received. That is, if the RAR is received in response to the preamble, the UE 905 having a plurality cell allowed for performing random access applies the TA, TPC, and UL grant included in the RAR to the serving cell 915 through which the preamble has been transmitted other than the serving cell 910 through which the RAR has been received.

The UE 905 performs Physical Uplink Shared Channel (PUSCH) transmission in the second cell 915 by applying the UL grant of the RAR at step 990. At this time, the UE 905 controls the PUSCH transmission by applying the third maxHARQ-Tx or the second maxHARQ-Tx acquired at step 965.

The eNB determines to configure the cell 917 of the non-primary set to the UE 905 at step 992. The serving eNB performs a predetermined procedure with the drift eNB and transmits the control information for configuring the SCell 917 of the primary set to the UE 905 at step 994. The non-primary set SCell 917 may be a PUCCH SCell. The control information may be transmitted to the UE through the RRC Connection Reconfiguration message. The control message may be configured as shown in table 4 or FIG. 7 or 8 and may include the information such as preambleTansMax3, ResponseWindowSize2, non-primary set information, the fourth maxHARQ-Tx, and the fifth maxHARQ-Tx. Here, the non-primary set information may include an indicator indicating that the eNB to which the SCell 917 belongs differs from the eNB to which the PCell 915 belongs.

As aforementioned, the random access information of the SCell is defined differently for the primary set and the non-primary set. The random access-related information is summarized in table 7.

TABLE 7

| | Random access-related information |
|---|---|
| Primary set SCell | preambleTansMax2, third maxHARQ-Tx |
| Non-primary set SCell | preambleTansMax3, ResponseWindowSize2, fourth maxHARQ-Tx, fifth maxHARQ-Tx |

The UE 905 transmits the preamble using predetermined frequency/time resource of the PUCCH SCell 917 at a predetermined time point at step 996.

After transmitting the random access preamble in the PUSCH SCell 917, the UE 905 monitors PDCCH of the PUCCH SCell 917 to determine whether an RAR is received during the ra-window having a size determined based on the ResponseWindowSize2 at step 997. Since the PCell 910 and PUCCH SCell 917 are controlled by different eNBs, it is inefficient to receive the response message through the PCell 910 in response to the preamble transmitted through the PUCCH SCell 917. Accordingly, when the preamble has been transmitted through a SCell, if the SCell is a primary set SCell 915, the UE 910 attempts receipt of the random access response message through the PCell 910 and, if the SCell is the PUCCH SCell 917, attempts receipt of the random access message through the corresponding cell 917. If no valid RAR is received through the PUCCH SCell 917, the UE retransmits the preamble through the PUCCH SCell 917. If it fails to complete the random access procedure even after a predetermined number of retransmission attempts, the UE 905 stops transmitting the preamble and takes a predetermined action. The predetermined number of retransmissions is equal to the preambleTransMax3.

If the valid RAR is received through the PUCCH SCell 917 at step 997, the UE 905 applies the UL grant, TPC, and TA included in the valid RAR to the uplink transmission through the serving cell 917 at step 998. The serving cell 917 is the serving cell through which the RAR has been received, i.e. the PUCCH SCell 917. The UE 905 adjusts the transmission start time of uplink subframe n to precede the start time (start boundary) of the downlink subframe n as much as TA. The UE also increases or decreases the uplink transmit power in the PUCCH SCell 917 as much as indicated by the TPC.

The UE 905 selects the transmission resource of a predetermined serving cell, i.e. PUCCH SCell 917, for uplink transmission. The UE performs uplink transmission at step 999.

Figure 10:
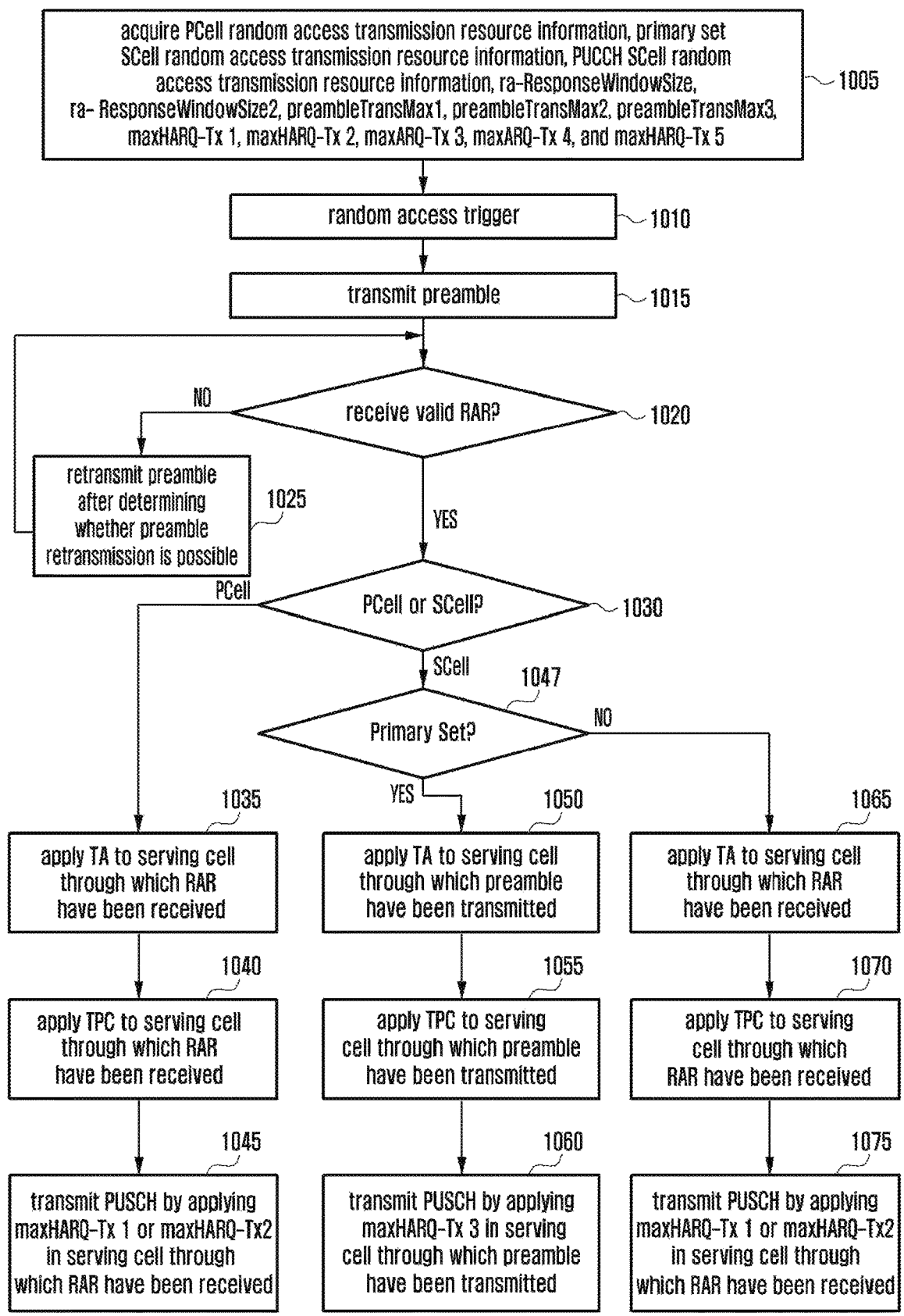
FIG. 10 is a flowchart illustrating the UE operation for random access according to an embodiment of the present invention.

FIG. 10 is a flowchart illustrating the UE operation for random access according to an embodiment of the present invention.

Referring to FIG. 10, the UE acquires the random access-related information at step 1005. There is the random access-related information as follows.

That is, the UE may acquire the random access-related information such as PCell random access transmission resource information (PCell prach-ConfigIndex, etc.), primary set SCell random access transmission resource information (SCell prach-ConfigIndex, etc.), non-primary set SCell (e.g. PUCCH SCell) random access transmission resource information (PUCCH SCell prach-ConfigIndex, etc.), ra-ResponseWindowSize, ra-ResponseWindowSize2, preambleTransMax1, preambleTransMax2, preambleTransMax3, maxHARQ-Tx 1, maxHARQ-Tx 2, maxHARQ-Tx 3, maxHARQ-Tx 4, and maxHARQ-Tx 5.

The aforementioned informations are acquired through various control messages such as system information block and dedicated control messages at various time points. For example, the PCell random access transmission resource information, ra-ResponseWindowSize, and preambleTransMax1 can be acquired through the systeminformationblock2 of the PCell, and the maHARQ-Tx 2 through the RRC Connection Setup message. Also, the primary set SCell random access transmission resource information, PUCCH SCell random access transmission resource information, ra-ResponseWindowSize2, preambleTransMax2, preambleTransMax3, maxHARQ-Tx 3, maxHARQ-Tx 4, and maxHARQ-Tx 5 may be acquired through the RRC connection reconfiguration message.

The random access procedure is triggered at step 1010. For example, if a high priority data occurs at the UE, if the eNB commands to perform random access, or if the UE needs to reestablish the RRC connection, the random access procedure may be triggered.

The UE identifies the valid PRACH occasion arriving soonest using the random access transmission resource information and transmits the preamble at the PRACH occasion at step 1015. The preamble transmit power is set in consideration of the downlink pathloss of the serving cell through which the preamble is transmitted.

The UE monitors the PDCCH of the PCell or the SCell through which the preamble has been transmitted to receive the response message during a predetermined period in replay to the preamble at step 1020. The predetermined period is the ra-window. For example, if the preamble has been transmitted through the PCell, the UE determines the maximum size of the ra-window by applying the ra-ResponseWindowSize acquired from the system information of the corresponding serving cell and monitors the PDCCH of the PCell during the ra-window. If the preamble has been transmitted through the primary set SCell, the UE determines maximum size of the ra-window by applying the ra-ResponseWindowSize acquired from the system information of a predetermined serving cell not identical with the corresponding serving cell, e.g. PCell, and monitors the PDCCH of the PCell during the ra-window. If the preamble has been transmitted through the non-primary set SCell or the PUCCH SCell, the UE determines the maximum size of the ra-window by applying ra-ResponseWindowSize2 and monitors the PDCCH of the PUCCH SCell during the ra-window.

If a valid RAR is received during the ra-window, the procedure goes to step 1030. If a valid RAR is received, this means that the UE has decoded the scheduling information with the RA-RNTI mapped to the transmission resource used by the UE for transmitting the preamble through the PDCCH of the PCell or the PUCCH SCell during the period specified by the ra-window and the Random Access Preamble ID (RAPID of the received RAR matches that of the preamble transmitted by the UE.

The UE checks whether it is possible to retransmit the preamble and, if possible, retransmits the preamble at step 1025 and returns the procedure to step 1020. Depending on the embodiment, in the PCell, if the number of preamble transmission times is not greater than preableTransMax2, it is possible to retransmit the preamble. In the PUCCH SCell, if the number of preamble transmission times is not greater than preambleTransMax3, it is possible to retransmit the preamble. The operation in the case where the number of preamble retransmission times is greater than a predetermined maximum allowed times is described in detail with reference to FIG. 11 later.

The UE determines whether the cell through which the preamble has been transmitted is the PCell or a SCell at step 1030. If the preamble has been transmitted through the PCell, the procedure goes to step 1035 and, otherwise, step 1047.

If the cell through which the preamble has been transmitted is the PCell, the UE applies TA to the serving cell through which the RAR has been received. For example, the UE moves up the uplink subframe boundary of the serving cell through which the RAR has been received as much as TA as compared to the downlink subframe boundary of the corresponding serving cell.

The UE configures the uplink transmit power of the serving cell through which the RAR has been received using the TPC included in the RAR at step 1040. In more detail, the UE calculates the PUCCH transmit power of the serving cell by accumulating the transmit power control values indicated by the TPC.

The UE transmits the PUSCH in uplink of the serving cell through which the RAR has been received by applying the UL grant included in the RAR at step 1045. If the preamble transmitted at step 1015 is the dedicated preamble, the maxHARQ-Tx 2 is applied to the PUSCH transmission and, otherwise if the preamble transmitted at step 1015 is the random preamble, the maxHARQ-Tx 1 is applied to the PUSCH transmission.

If it is determined that the cell through which the UE has transmitted the preamble is a SCell at step 1030, the UE determines whether the SCell through which the preamble has been transmitted is a primary set SCell at step 1047. If the SCell is a primary set SCell, the procedure goes to step 1050 and, otherwise if the cell is non-primary set cell, e.g. PUCCH SCell, the procedure goes to step 1065.

If the SCell through which the preamble has been transmitted is a primary set SCell, the UE applies, at step 1050, the TA to the serving cell through which the preamble has been transmitted at step 1015 other than the serving cell through which the RAR has been received. That is, the UE moves up the uplink subframe boundary of the serving cell through which the preamble has been transmitted as much as TA as compared to the downlink subframe boundary of the serving cell through which the preamble has been transmitted. The uplink transmission timing is applied to the uplink of all the serving cells belonging to the same TAG as the serving cell through which the preamble has been transmitted. That is, the TA is applied to all of the serving cells belonging to the same TAG as the serving cell through which the preamble has been transmitted. TAG denotes a set of one or more serving cells sharing the same uplink transmission timing. If the serving cells belonging to one TAG share the same uplink transmission timing, this means that the uplink transmission timings of the serving cells are identical with each other and these serving cells establish or loose the uplink synchronization simultaneously. Also, the uplink transmission timings thereof are adjusted simultaneously. A TAG is classified into one of primary TAG and secondary TAG. The primary TAG is the TAG including the primary cell, and the secondary TAG is the TAG composed of only the secondary cells. The primary TAG allows random access only in the primary cell while the secondary TAG allows random access only in a predetermined secondary cell. When adding a SCell, the eNB notifies the UE whether the SCell belongs to the primary TAG or the secondary TAG and, if it belongs to the secondary TAG, which secondary TAG.

The UE sets the uplink transmit power of the serving cell through which the preamble has been transmitted at step 1015 using the TPC included in the RAR at step 1055. In more detail, the UE calculates the PUSCH transmit power of the serving cell by accumulating the transmit power adjustment values indicated by the TPC.

The UE transmits PUCCH in uplink of the serving cell through which the preamble has been transmitted by applying the UL grant included in the RAR at step 1060. At this time, the maxHARQ-Tx 3 is applied to PUSCH transmission.

If it is determined that the SCell through which the preamble has been transmitted is not a primary set SCell at step 1047, the UE applies the TA to the serving cell through which the RAR has been received or the serving through which the preamble has been transmitted at step 1065.

The UE sets the uplink transmit power of the serving cell through which the RAR has been received using the TPC included in the RAR at step 1070. In more detail, the UE calculates the PUSCH transmit power of the serving cell by accumulating the transmit power adjustment value indicated by the TPC.

The UE transmits the PUSCH in the uplink of the serving cell through which the RAR has been received or the serving cell through which the preamble has been transmitted by applying the UL grant included in the RAR at step 1075. At this time, if the preamble transmitted at step 1015 is the dedicated preamble, the maxHARQ-Tx 5 is applied to the PUSCH transmission and, otherwise if the preamble is a random preamble, the maxHARQ-Tx 4 is applied to the PUSCH transmission.

Figure 11:
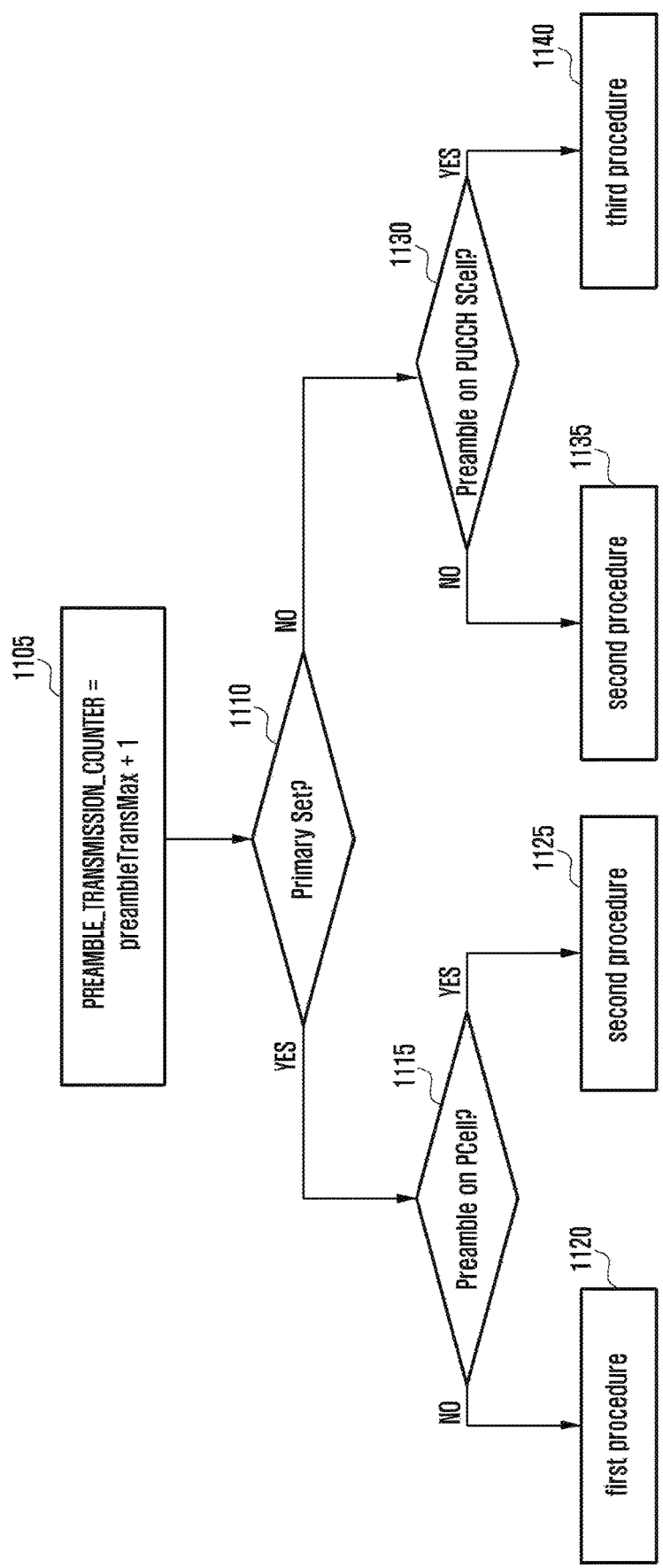
FIG. 11 is a flowchart illustrating the UE operation associated with the random access failure according to an embodiment of the present invention.

FIG. 11 is a flowchart illustrating the UE operation associated with the random access failure according to an embodiment of the present invention.

In order to prevent the UE from retransmitting the preamble infinitely, a parameter called preambleTransMax can be used. As described above, a plurality of preambleTransMax can be configured to one UE, and the UE operates differently depending on the type of the cell through which the preamble is transmitted.

Referring to FIG. 11, random access failure may occurs even after the maximum allowed number of preamble transmission attempts. If the random access procedure is initiated, the UE initializes the PREAMBLE_TRANSMISSION_COUNTER to 1. If it is necessary to retransmit the preamble, e.g. if no valid RAR is received during the ra-window or if the contention resolution fails, the UE increments the PREAMBLE_TRANSMISSION_COUNTER by 1. If the PREAMBLE_TRANSMISSION_COUNTER becomes equal to a value acquired by adding 1 to the preambleTransMax, the UE determines that a problem has occurred in the random access procedure and thus takes a necessary action.

As described above, different preambleTransMax can be applied to PCell, SCell, primary set, and non-primary set. The preambleTransMax applied to the PCell (hereinafter, referred to as preambleTransMax1) is acquired from the system information of the PCell, and the PreambleTransMax applied to the primary set SCell (hereinafter, referred to PreambleTransMax2) is acquired from the SCell add control message, e.g. RRC connection reconfiguration message. The non-primary set SCell, e.g. PreambleTransMax applied to the PUCCH SCell (hereinafter, referred to as PreambleTransMax3) is classified into two types. The first PreambleTransMax3 is acquired from the non-primary set SCell or PUCCH SCell add control message, e.g. RRC connection reconfiguration message. Whereas the second PreambleTransMax3 is acquired form the system information of the PUCCH SCell. In association with the random access of the UE through the PUCCH SCell, the first PreambleTransMax3 is applied in the initial random access procedure, and the second PreambleTransMax3 is applied after the system information is acquired from the PUCCH SCell. The UE may apply the first PreambleTransMax3 for the random access in the non-primary set which is not the PUCCH SCell. The first PreambleTransMax3 of the PUCCH SCell may differ from the first PreambleTransMax3 of the non-primary set SCell.

If a situation where the PREAMBLE_TRANSMISSION_COUNTER becomes equal to the value acquired by adding 1 to the preambleTransMax in the PCell, the PREAMBLE_TRANSMISSION_COUNTER becomes equal to the value acquired by adding 1 to the preambleTransMax2 in the primary set SCell, or the PREAMBLE_TRANSMISSION_COUNTER becomes equal to the value acquired by adding 1 to the preambleTransMax3 in the non-primary set SCell or PUCCH SCell occurs in performing random access, the procedure goes to step 1110.

The UE determines whether the serving cell through which the preamble has been transmitted belongs to the primary set or the non-primary set at step 1110. If the cell is belongs to the primary set, the procedure goes to step 1115 and, otherwise, step 1130.

If the serving cell through which the preamble has been transmitted belongs to the primary set, the UE determines whether the serving cell is the PCell or SCell at step 1115. If the serving cell is the SCell, the procedure goes to step 1120 and, otherwise the serving cell is the PCell, step 1125.

If it is determined that the serving cell through which the preamble has been transmitted is the SCell at step 1115, the UE performs the first procedure at step 1120.

Otherwise if it is determined that the serving cell through which the preamble has been transmitted is the PCell at step 1115, the UE performs the second procedure at step 1125.

If it is determined that the serving cell through which the preamble has been transmitted belongs to the non-primary set at step 1110, the UE determines whether the serving cell is a PUCCH SCell at step 1130. If the serving cell is the PUCCH SCell, the procedure goes to step 1140 and, otherwise, step 1135.

If it is determine that that serving cell through which the preamble has been transmitted is not a PUCCH SCell at step 1130, the UE performs the first procedure at step 1135.

Otherwise if the serving cell through which the preamble has been transmitted is a PUCCH SCell at step 1130, the UE performs the third procedure at step 1140.

If the first procedure is performed, this means that the serving cell through which the preamble has been transmitted, i.e. the serving cell having a problem in random access, is a SCell belonging to the primary set or non-primary set SCell but not PUCCH SCell. The random access problem is the problem of the corresponding SCell and affects no influence to the PCell, PUCCH SCell, or other sets. Accordingly, the UE stops transmitting preamble and, if SRS is configured to the corresponding SCell, the SRS too in the first procedure (at this time the SRS transmission resource is released) without further actions.

If the second procedure is performed, this means that the serving cell through which the preamble has been transmitted, i.e. the serving cell having a problem in random access, is the PCell. If a random access problem has occurred, this means that there is significant information in downlink and uplink of the PCell and thus the UE reestablishes the current RRC connection. This means that the UE stops downlink/uplink operations in the PCell and starts the RRC connection reconfiguration procedure. The UE takes the PUCCH SCell first in consideration as the cell to perform the RRC connection reconfiguration procedure. If the RRC connection reconfiguration is performed, this means to select a cell having the downlink channel quality higher than a predetermined threshold to transmit the RRC connection reconfiguration request message. If the eNB controlling the cell has the information on the UE, the eNB sends the UE the RRC connection reconfiguration message through the cell, and the UE continues communication maintaining the current configuration in the cell. If it has no UE information, the eNB sends the UE the RRC connection reconfiguration reject message, and the UE transitions to the idle state and initiates the RRC connection setup procedure.

If the third procedure is performed, this means that the serving cell through which the preamble has been transmitted, i.e. the serving cell having a problem in random access, belongs to a non-primary set and the PUCCH SCell. If the serving cell through which the preamble has been transmitted, i.e. the serving cell having a problem in random access, belongs to the non-primary set and is the PUCCH SCell, the random access error may cause significant problem in downlink or uplink of the PUCCH SCell and thus it is impossible to perform data transmission any longer in the corresponding non-primary set as well as the PUCCH SCell. This is because the PUCCH transmission is impossible in the corresponding non-primary set. In this case, the UE may perform the third procedure. The third procedure may be composed of the following steps.

Release PUCCH transmission resource configured to PUCCH SCell

Deactivate SCells belonging to non-primary set

Generate and transmit predetermined RRC control message through serving cell of primary set. The RRC control message includes the information for use in identifying the non-primary set in which the problem has occurred and the information indicating the type of the problem (i.e. random access problem) to report that the communication cannot be performed normally in the non-primary set.

Figure 12:
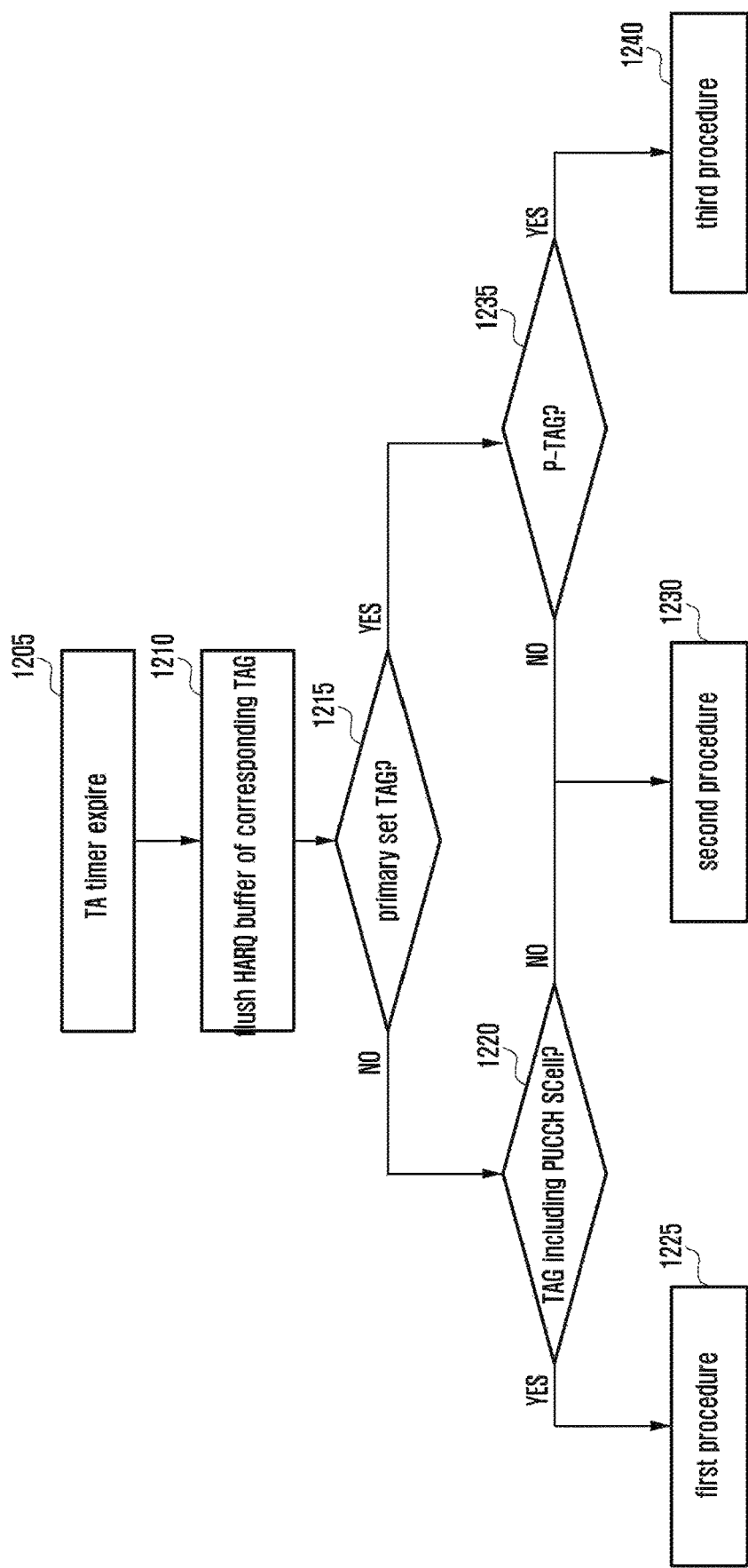
FIG. 12 is a flowchart illustrating the UE operation associated with expiry of TA timer according to an embodiment of the present invention.

FIG. 12 is a flowchart illustrating the UE operation associated with expiry of TA timer according to an embodiment of the present invention.

The time (timeAlignmentTimer, hereinafter referred to TAT) is set and runs per TAG. When the TA timer of a certain TAG expires, the UE may operate differently depending on whether the TAG is of primary set TAT or non-primary set TAG.

The TAT (timeAlignmentTimer) of a certain TAG expires at a certain time point at step 1205. The TAT is set per TAG. The TAG of a TAG starts first in the initial random access procedure of the TAG and restarts whenever a TA command for the TAG is received. While the TAT does not run, the uplink signal transmission is prohibited with the exception of the preamble transmission in the corresponding TAG. If the TAG expires, this means that no TA command has been received for the TAG during the period specific by the TAT.

The UE flushes the HARQ buffers of the serving cells belonging to the corresponding TAG at step 1210. This is done to prevent non-adaptive HARQ retransmission from being performed in the corresponding cell.

The UE determines whether the serving cells belonging to the TAG are primary set serving cells or non-primary set serving cells at step 1215. If the serving cells are the primary set serving cells, the procedure goes to step 1235 and, otherwise, step 1220.

If the serving cells belonging to the TAG are the non-primary set serving cells, the UE determines whether PUCCH SCell exists among the serving cells belonging to the TAG at step 1220.

If the PUCCH SCell exists among the serving cells belonging to the TAG at step 1220, the procedure goes to step 1225 to perform the first procedure.

If the PUCCH SCell does not exist among the serving cell belonging to the TAG at step 1220, the procedure goes to step 1230 to perform the second procedure.

If the serving cells belonging to the TAG are the primary set serving cells at step 1215, the UE determines whether the corresponding TAG is P-TAG or S-TAG at step 1235.

If the corresponding TAG is the P-TAG at step 1235, the procedure goes to step 1240 to perform the third procedure.

If the corresponding TAG is the S-TAG at step 1235, the procedure goes to step 1230 to perform the second procedure.

The first procedure is taken when the serving cells of the TAG of which TAT has expired are the serving cells of the non-primary set (when TAG is the TAG of non-primary set, or the TAG is not the TAG of the primary set) and the PUCCH SCell exists among the cells belonging to the TAG. In this case, the UE stops transmitting PUCCH and SRS in the PUCCH SCell and releases the PUCCH and SRS transmission resources. The UE also stops transmitting SRS in the rest SCells belonging to the TAG and releases the SRS transmission resource. For reference, if a plurality TAGs are configured in the non-primary set, the PUCCH SCell exists in one of the TAGs.

The second procedure is taken when the serving cells of the TAG of which TAT has expired are the serving cells of the non-primary set and no PUCCH SCell exists among them or when the serving cells of the TAG of which TAT has expired are the serving cells of the primary set and no PCell exists among them. In this case, the UE stops transmitting SRS in the SCells belonging to the TAG and releases the SRS transmission resource.

The third procedure is taken when the serving cells of the TAG of which TAG has expired are the serving cells of the primary set and the PCell exists among them. In this case, the UE stops transmitting PUCCH and SRS in the PCell and releases the PUCCH and SRS transmission resources. The UE also releases the SRS resources of the SCells belonging to the P-TAG. If Semi-Persistent Scheduling (SPS) is in use, the UE releases the SPS resource. That is, the UE releases the configured uplink grant and the configured downlink assignment. The SPS is a technique of allocating transmission resource semi-persistently to minimize the use of the transmission resource allocation signal for the serving generating small packets periodically. At this time, the transmission resource allocated once can be used until a control signal is received or a predetermined condition is fulfilled for release of the resource.

Figure 13:
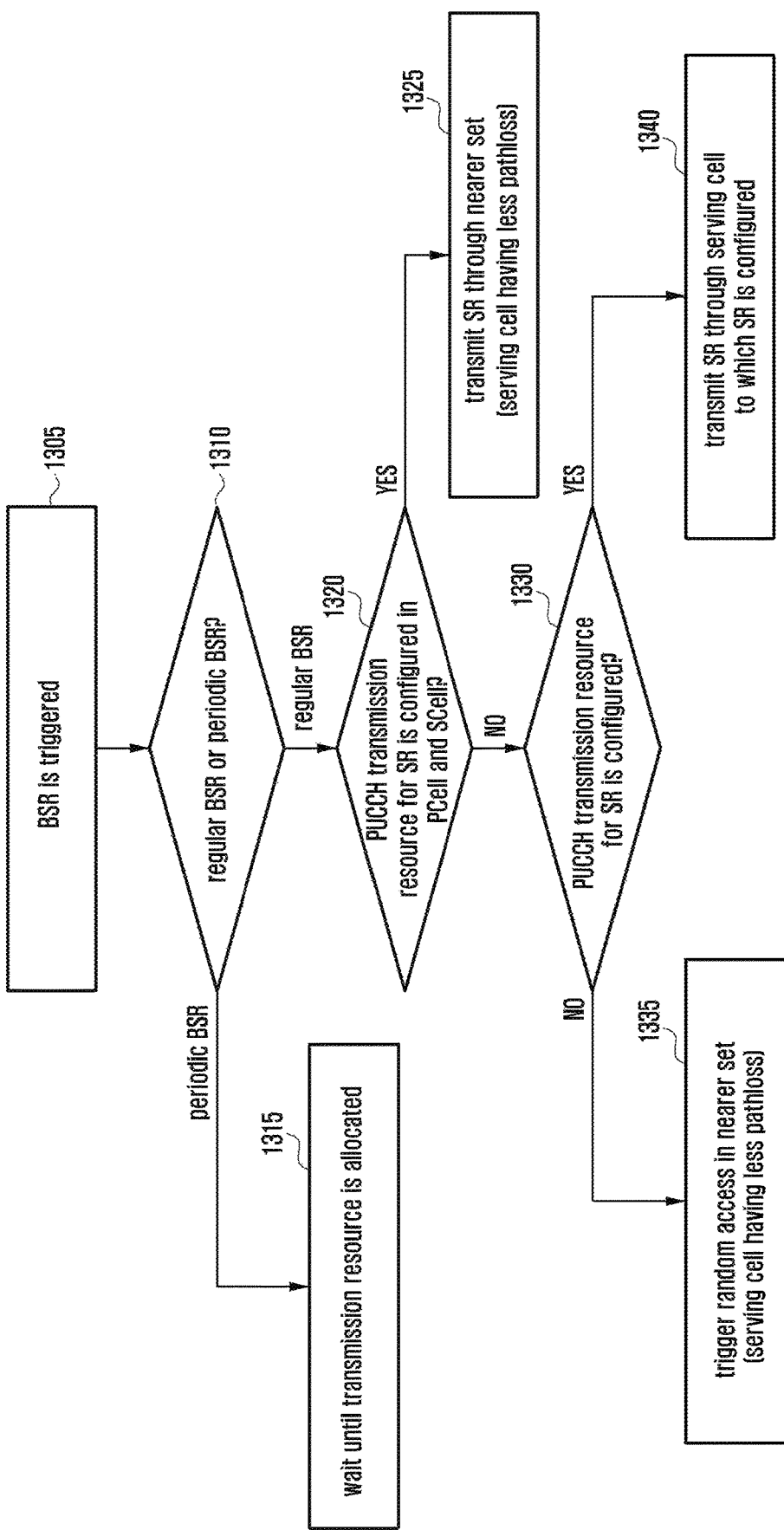
FIG. 13 is a flowchart illustrating the UE operation of transmitting Scheduling Request (SR) in the primary set and non-primary set according to an embodiment of the present invention.

FIG. 13 is a flowchart illustrating the UE operation of transmitting Scheduling Request (SR) in the primary set and non-primary set according to an embodiment of the present invention.

A UE has to request an eNB for transmission resource in order to transmit data in uplink. The UE may request for the transmission resource using the SR transmission resource allocated to itself or the random access procedure. The transmission resource request using the SR transmission resource is referred to as Dedicated-Scheduling Request (D-SR), and the transmission resource request using the random access procedure is referred to as Random Access-Scheduling Request (RA-SR) procedure. The SR transmission resource is allocated as a part of the PUCCH transmission resource. The PUCCH transmission resource can be allocated to the UE in the PCell or the PUCCH SCell, and the UE may be allocated one or more SR transmission resources at a certain time point.

The UE has to define the scheme of selecting the SR transmission resource to be used. In the case that the non-primary set is configured to the UE, it is preferred to transmit data through the non-primary set if possible. The serving cells of the non-primary cells are likely to be the pico cells other than macro cells and, since the pico cell operate at low uplink transmit power as compared to the macro cells, it is preferred to transmit data through the non-primary set in view of the power consumption. FIG. 13 is directed to the method of selection SCell prior to PCell for transmitting SR, if the SR transmission resource has been allocated for use in the SCell, to minimize the power consumption of the UE.

At step 1305, Buffer Status Report is triggered at the UE. The BSR is the control information which the UE reports its buffer state to the eNB using one of the short BSR and long BSR formats. The BSR may carry the Buffer Status (BS) of at one and up to 4 Logical Channel Group (LCG). The short BSR is used when there is one LCG having the data to be transmitted and is composed of the LCG identifier and BS. The long BSR is used to report the buffer status of four LCGs and contains the BSs of the LCGs in an order of the LCG identifiers. The LCG is a set of the logical channel grouped under the control of the eNB, and the logical channels have similar logical channel priorities. The buffer status of the LCG is the sum of the buffer status related to the logical channels included in the LCG and shows the data amount that can be transmitted among the data of RLC transmission buffer, retransmission buffer, PDCP transmission buffer of the logical channels. The BSR may be triggered periodically or when a predetermined condition is fulfilled, e.g. when the data having a priority higher than that of the currently stored data occurs. The former is referred to as periodic BSR, and the latter is referred to as regular BSR.

The UE determines whether the triggered BSR is the periodic BSR or the regular BSR at step 1310. If the regular BSR is triggered, the procedure goes to step 1320 and, otherwise if the periodic BSR is triggered, step 1315.

If the triggered BSR is the periodic BSR, the UE waits for the transmission resource allocation for use in transmitting the BSR at step 1315.

Otherwise if the triggered BSR is the regular BSR, the UE starts the procedure of requesting for the transmission resource allocation for BSR transmission at step 1320. This is done because that regular BSR is required to be transmitted to the eNB immediately unlike the periodic BSR.

The UE determines whether the SR transmission resource has been allocated for the PCell and SCell (e.g. PUSCH SCell) at step 1320. If so, the procedure goes to step 1325 and, otherwise, step 1330.

If the SR transmission resource has been allocated for the PCell and SCell at step 1320, the UE transmits the SR using the SR transmission resource of the serving cell nearest to the current location of the UE among the set (or serving cell) to which the SR transmission resource has been allocated. The UE may determine the serving cell having the least pathloss as the nearest serving cell among the serving cells to which the SR transmission resource has been allocated.

If the SR transmission resource has not been allocated to the PCell and SCell at step 1320, the UE determines whether there is a serving cell to which the SR transmission resource has been allocated at step 1330.

If there is any serving cell to which the SR transmission resource has been allocated at step 1330, the UE transmits the SR using the SR transmission resource of the serving cell to which the SR transmission resource has been allocated at step 1340.

Otherwise if there is no serving cell to which the SR transmission resource has been allocated at step 1330, the UE initiates random access in the serving cell nearest to the current location of the UE (i.e. the serving cell having the least pathloss) among the serving cell available for random access (e.g. PCell and PUCCH SCell) at step 1345.

Figure 14:
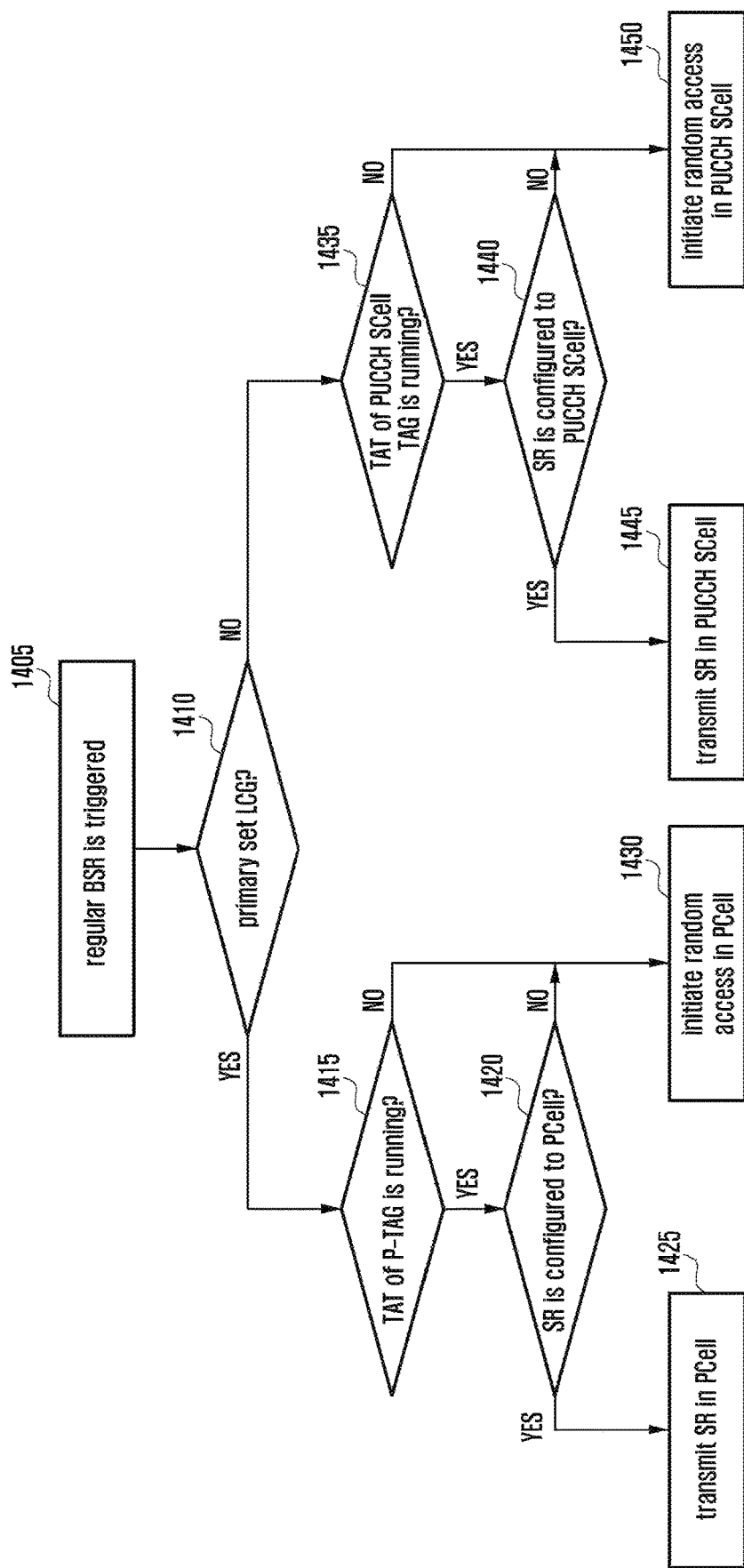
FIG. 14 is a flowchart illustrating the UE operation of transmitting Scheduling Request (SR) through the primary set and non-primary set according to another embodiment of the present invention.

FIG. 14 is a flowchart illustrating the UE operation of transmitting Scheduling Request (SR) through the primary set and non-primary set according to another embodiment of the present invention.

When the inter-eNB carrier aggregation is configured, the logical channels can be processed per set. For example, the logical channel of the serving generating small data and sensitive to transmission delay and jitter such as VoIP may be processed through the serving cell of the primary set, and the logical channel of the serving generating large data such as FTP may be processed through the serving cell of the non-primary set. As described above, the eNB may instruct the UE to process a part of the DRB in the serving cell of the non-primary set. The logical channel processed in the serving cell of the primary set is referred to as primary set logical channel, and the logical channel processed in the serving cell of the non-primary set is referred to as non-primary set logical channel. The eNB may notify the UE of the primary set logical channel and non-primary set logical channel using the control message such as RRC connection reconfiguration message. At this time, it is possible to notify of the non-primary set logical channel explicitly while the rest logical channel are configured as the primary set logical channel.

The regular BSR is triggered when high priority data occurs. At this time, the UE selects the serving cell to transmit SR depending on whether the BSR is triggered by the data on the logical channel of the primary set or the data on the logical channel of the non-primary set.

Referring to FIG. 14, if the regular BSR is triggered at step 1405, the UE determines whether the regular BSR is triggered for the reason of the data of the primary set logical channel (or primary set LCG) or the data of the non-primary set logical channel (or non-primary set LCG) at step 1410. If the regular BSR is triggered for the reason of the primary set logical channel data, the procedure goes to step 1415 and, otherwise if the regular BSR is triggered for the reason of the non-primary set logical channel data, step 1435.

If the regular BSR is triggered for the reason of the primary set logical channel data, the UE determines whether the TAT of the P-TAG is running at step 1415.

If the TAT of the P-TAG is running, the uplink signal transmission is prohibited with the exception of preamble and thus the UE starts the random access procedure in the PCell at step 1430. If a valid RAR message is received, the UE adjusts the uplink transmission timing by applying the TA indicated by the RAR message and transits the regular BSR through the PCESS using the uplink transmission resource.

If the TAT of the P-TAG is running at step 1415, the UE determines whether SR transmission resource is allocated on PUCCH of the PCell at step 1420. If no SR transmission resource is not allocated on PUCCH of the PCell, the procedure goes to step 1430 and, otherwise, step 1425.

If it is determined that the SR transmission resource is allocated on the PUCCH of the PCell at step 1420, the UE starts SR transmission procedure in the PCell at step 1425.

If it is determined that no SR transmission resource is allocated on the PUCCH of the PCell at step 1420, the UE starts random access procedure in the PCell at step 1430.

If it is determined that the regular BSR is triggered for the reason of the data of the non-primary set logical channel at step 1410, the UE determines whether the TAT of the TAG to which the PUCCH SCell belongs is running at step 1435. If the TAT of the TAG to which the PUCCH SCell belongs is running, the procedure goes to step 1440 and otherwise, step 1450.

If it is determined that the TAT of the TAG to which the PUCCH SCell belongs is running at step 1435, the UE determines whether any SR transmission resource is allocated on the PUCCH of the PUCCH SCell at step 1440. If no SR transmission resource is allocated on the PUCCH of the PUCCH SCell, the UE starts the SR transmission procedure at step 1445. The SR transmission procedure is described in detail with reference to FIG. 15.

If it is determined that the TAT of the TAG to which the PUCCH SCell belongs is not running at step 1435 or if it is determine that no SR transmission resource is allocated on the PUCCH of the PUCCH SCell at step 1440, the UE starts the random access procedure in the SCell at step 1450. In more detail, the UE starts the random access procedure in the SCell allowed for random access among the SCells of the non-primary set. If a valid RAR message is received through the SCell, the UE adjusts the uplink transmission timing and transmits the regular BSR through the serving cell of the non-primary set using the uplink transmission resource. The SCell allowed for random access in the non-primary set may be the PUCCH SCell.

Figure 15:
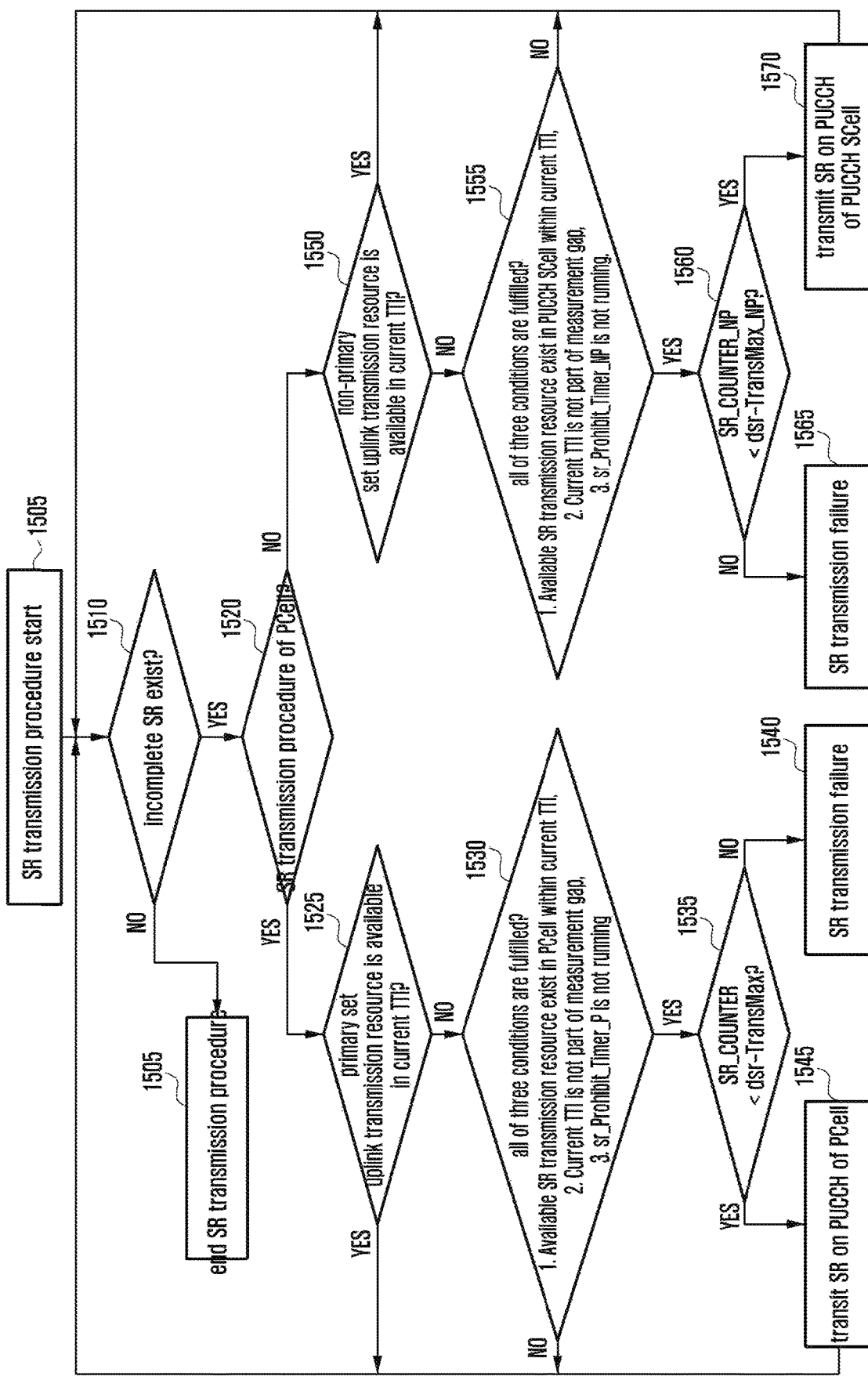
FIG. 15 is a flowchart illustrating the UE operation of transmitting Scheduling Request (SR) in the primary set and non-primary set according to another embodiment of the present invention.

FIG. 15 is a flowchart illustrating the UE operation of transmitting Scheduling Request (SR) in the primary set and non-primary set according to another embodiment of the present invention.

Referring to FIG. 15, the UE starts the SR transmission procedure at step 1505. The UE determines whether any incomplete SR at step 1510. If there is any incomplete SR, the procedure goes to step 1520 and, otherwise, step 1515 to end the SR transmission procedure.

The SR is triggered along with the regular BSR and regarded as not completed before being canceled. The SR is classified into one of primary SR and non-primary SR. If the BSR triggered along with the SR is the BSR of the primary set (i.e. if the BSR includes the primary set logical channel buffer status and triggered by the data of the primary set logical channel), the SR is the primary SR. If the BSR triggered along with the SR is the BSR of the non-primary set (i.e. if the BSR includes the non-primary set logical channel buffer status and triggered by the data of the non-primary set logical channel), the SR is the non-primary SR. the primary SR cancellation condition and the non-primary SR cancellation condition are as follows.

[Primary SR Cancellation Condition]

A MAC PDU to be transmitted through the primary set, the PDU includes a BSR, and the BSR reflects the buffer status up to the time point when the last event that triggered the primary set BSR (MAC PDU for the primary set is assembled and this PDU includes a BSR which includes buffer status up to (and including) the last event that triggered a primary set BSR).

[Non-Primary SR Cancellation Condition]

A MAC PDU to be transmitted through the non-primary set is generated, the PDU includes a BSR, and the BSR reflects the buffer status up to the time point when the last event that triggered the non-primary set BSR (MAC PDU for the non-primary set is assembled and this PDU includes a BSR which includes buffer status up to (and including) the last event that triggered a non-primary set BSR).

If there is any incomplete SR at step 1510, the UE determines whether the SR is triggered along with the BSR of the primary set at step 1520.

Or the UE determines whether the SR is triggered for PUCCH of the PCell. If the SR is triggered for the primary set or the PCell, the procedure goes to step 1525. Otherwise if the SR is triggered along with the BSR of the non-primary set or for the PUCCH of the PUCCH SCell, non-primary set, or PUSCH SCell, the procedure goes to step 1550.

If it is determined that the SR is triggered along with the BSR of the primary set or for the PCell at step 1520, the UE determines whether there is any serving cell allocated available uplink transmission resource among the serving cells of the primary set within the current TTI at step 1525 (check if UL-SCH is available for a transmission on the primary set serving cell). If there is available transmission resource, the procedure returns to step 1510 and, otherwise, step 1530.

At step 1530, the UE checks the three conditions as follows to determine whether the SR transmission is possible through the PUCCH of the PCell within the current TTI.

1. Available SR transmission resource is configured on the PUCCH of the PCell in the current TTI.
2. The current TTI is not a part of a measurement gap.
3. The sr-ProhibitTimer related to the PCell SR transmission (sr_Prohibit_Timer_P) is not running.

The measurement gap is the time duration which the eNB configures to the UE to perform measurement on other frequencies and in which the UE does not transmit/receive signal.

The sr-ProhibitTimer aims to prevent the UE from transmitting the SR so frequently and starts when the SR is transmitted. The sr-ProhibitTimer of the primary set (or PCell) and the sr-ProhibitTimer of the non-primary set (or PUCCH SCell) operate separately and may be set to different values. Both the sr-ProhibitTimer's are determined by the eNB and notified to the UE through a control message such as the RRC connection reconfiguration method.

If all of the three conditions are fulfilled, the procedure goes to step 1535 and, otherwise at least one of the three conditions is not fulfilled, returns to step 1510.

The UE compares the SR_COUNTER and the dsr-TransMax at step 1535. If the SR_COUNTER is less than the dsr-TransMax, the procedure goes to step 1545 and, otherwise, step 1540.

The SR_COUNTER denotes the number of SR transmission times of the UE, and the UE increments this variable by 1 whenever the SR is transmitted and initializes the variable when the SR is cancelled. The dsr-TransMax is a variable for preventing the SR from being repeated infinitely and is informed to the UE through a control message such as RRC connection reconfiguration message.

If the SR_COUNTER is not less than the dsr-TransMax, the UE determines that the SR transmission has failed and takes a necessary action at step 1540. The action is described in detail with reference to FIG. 16.

If the SR_COUNTER is less than the dsr-TransMax, the UE transmits the SR through the PUCCH of the PCell, increments the SR_COUNTER by 1, and starts sr_Prohibit_Timer at step 1545, and then returns the procedure to step 1510.

If it is determined the SR is not triggered along with the BSR of the primary set or not for the PCell at step 1520, the UE determines whether there is any serving cell having uplink transmission resource available among the serving cells of the non-primary set within the current TTI (check if UL-SCH is available for a transmission on the corresponding non primary set serving cell). If there is any cell having transmission resource available, the procedure returns to step 1510 and, otherwise, step 1555.

At step 1555, the UE checks the three conditions as follows to determine whether the SR transmission is possible through the PUCCH of the PUCCH SCell within the current TTI.

1. Available SR transmission resource is configured on the PUCCH of the PUCCH SCell in the current TTI.
2. The current TTI is not a part of the measurement gap.
3. The sr-ProhibitTimer related to the PUCCH SCell PCell SR transmission (sr_Prohibit_Timer_NP) is not running.

If all of the three conditions are fulfilled, the procedure goes to step 1560 and, otherwise at least one of the three conditions is not fulfilled, returns to step 1510.

At step 1560, the UE compares the SR_COUNTER_NP and the dsr-TransMax_NP. If the SR_COUNTER_NP is less than the dsr-TransMax_NP, the procedure goes to step 1570 and, otherwise, step 1565.

The SR_COUNTER_NP denotes the number of SR transmission times of the UE, and the UE increments this variable by 1 whenever the SR is transmitted and initializes the variable when the SR is cancelled. The dsr-TransMax_NP is a variable for preventing the SR from being repeated infinitely and is informed to the UE through a control message such as RRC connection reconfiguration message.

If the SR_COUNTER_NP is not less than the dsr-TransMax_NP, the UE determines that the SR transmission has failed and takes a necessary action at step 1565. The action is described in detail with reference to FIG. 16.

If the SR_COUNTER_NP is less than the dsr-TransMax_NP, the UE transmits the SR through the PUCCH of the PCell, increments the SR_COUNTER_NP by 1, and starts sr_Prohibit_Timer_NP at step 1570, and then returns the procedure to step 1510.

Figure 16:
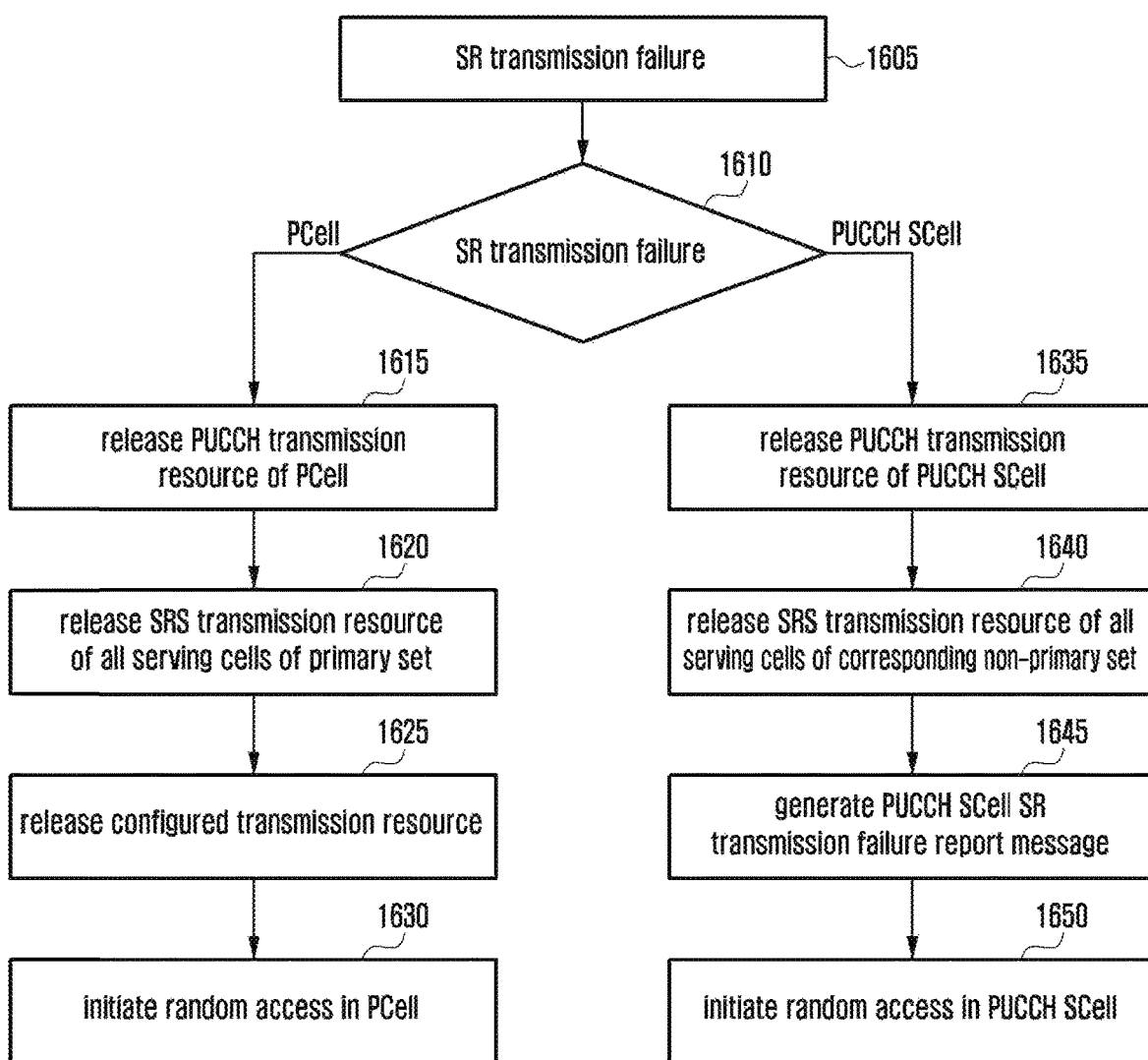
FIG. 16 is a flowchart illustrating the UE operation when the Scheduling Request (SR) transmission has failed according to an embodiment of the present invention.

FIG. 16 is a flowchart illustrating the UE operation when the Scheduling Request (SR) transmission has failed according to an embodiment of the present invention.

Referring to FIG. 16, the SR transmission failure occurs at step 1605. The UE determines whether the SR transmission failure has occurred in the PCell or the PUCCH SCell at step 1610. That is, the UE checks whether the SR transmission failure is determined based on the result of comparison between SR_COUNTER and dsr-TransMax or the result of comparison between SR_COUNTER_NP and dsr-TransMax_NP.

If it is determined that the SR transmission failure has occurred in the PCell (or the primary set), the procedure goes to step 1615. Otherwise if the SR transmission failure has occurred in the PUCCH SCell (or non-primary set), the procedure goes to step 1635.

If the SR transmission failure occurs in the PCell, this means that there is any problem in uplink transmission of the PCell. If the SR transmission failure occurs in the PUCCH SCell, this means that there is any problem in the uplink transmission of the PUCCH SCell. For example, the problem may be uplink transmission power configuration error. In this case, there is a need of taking an action for the corresponding set as well as the corresponding cell.

If the SR transmission failure has occurred in the PCell (or primary set), the UE releases the PUCCH transmission resource of the PCell at step 1615 and releases the SRS transmission resource of all the serving cells of the primary set (or SRS transmission resource of the P-TAG serving cells) at step 1620. The UE releases the configured transmission resource, i.e. configure uplink grant and configured downlink assignment, at step 1625. Next, the UE starts random access in the PCell at step 1630. As described above, the SR transmission failure may be caused by the uplink transmission power configuration error, and the uplink transmission power may be reconfigured through power ramping in the random access procedure.

If the SR transmission failure has occurred in the PUCCH SCell (non-primary set), the UE releases the PUCCH transmission resource of the PUCCH cell at step 1635 and releases the SRS transmission resource of all the serving cells of the corresponding non-primary set (or the SRS resource of the serving cells belonging to the same TAG as the PUCCH SCell) at step 1640. The UE generates an RRC control message for reporting the SR failure in the PUCCH SCell at step 1645. The control message may include the identifier of the PUCCH SCell in which the SR transmission failure has occurred and SR transmission power information (e.g. average or maximum value of the transmit power applied to the SR transmission or the information indicating whether the SR transmission power is greater than the maximum transmit power). The UE starts the SR transmission procedure of the PCell to transmit the RRC control message promptly and transmits the RRC control message to the primary set serving cell.

Figure 17:
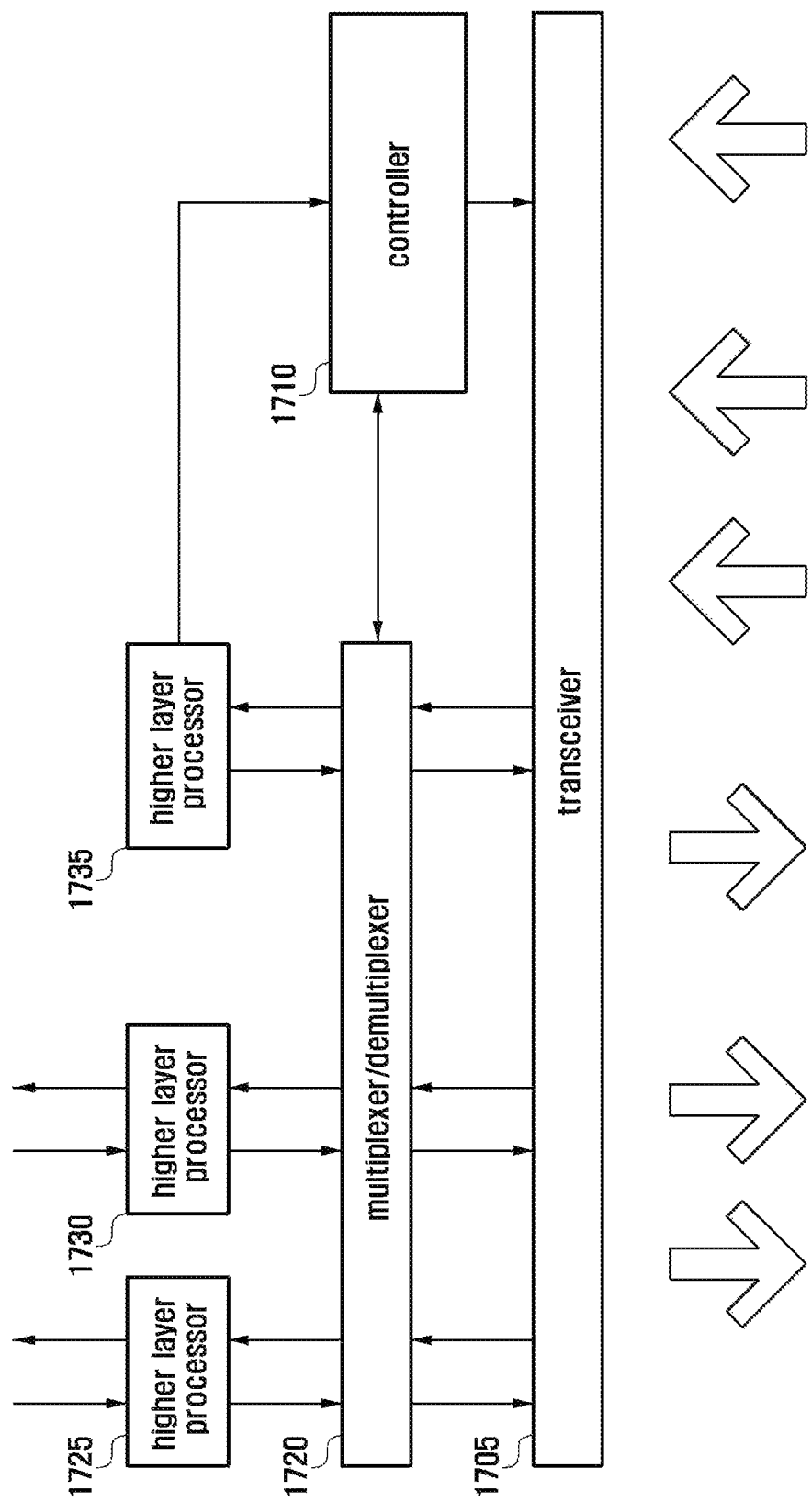
FIG. 17 is a block diagram illustrating a configuration of the UE according to an embodiment of the present invention.

FIG. 17 is a block diagram illustrating a configuration of the UE according to an embodiment of the present invention.

Referring to FIG. 17, the UE according to an embodiment of the present invention includes a transceiver 1705, a controller 1710, a multiplexer/demultiplexer 1720, a control message processor 1735, and various higher layer processors 1725 and 1730.

The transceiver 1705 receives data and predetermined control signals on the downlink channel of the serving cell and transmits data and predetermined control signals on the uplink channel. In the case that a plurality of serving cells is configured, the transceiver 1705 transmits/receives data and control signals through the plural serving cells.

The multiplexer/demultiplexer 1720 multiplexes the data generated by the higher layer processors 1725 and 1730 and the control message processor 1735 and demultiplexes the data received by the transceiver 1705, the demultiplexed data being delivered to the higher layer processors 1725 and 1730 or the control message processor 1735.

The control message processor 1735 is an RRC layer entity which takes an action necessary for processing the control message received from the eNB. For example, the control message processor 1735 processes the received random access-related information and delivers the processing result to the controller.

The higher layer processors 1725 and 1730 are established per service. The higher layer processor processes the data generated by the user service such as File Transfer Protocol (FTP) and Voice over Internet Protocol (VoIP), the processing result being delivered to the multiplexer/demultiplexer 1720, and processes the data from the multiplexer/demultiplexer 1715, the processing result being delivered to the higher layer service application.

The controller 1710 controls the transceiver 1705 and the multiplexer/demultiplexer 1720 to perform uplink transmission using appropriate resource at an appropriate timing based on the scheduling command, e.g. uplink grants, received by the transceiver 1705.

The controller controls overall operations associated with random access and SR transmission. In more detail, the controller performs control operations of the UE as described with reference to FIGS. 5 to 16. For example, the controller may control receiving an SCell add command including configuration information on the secondary serving cell (SCell) to be added from the primary serving cell (PCell), transmitting a preamble to the SCell to be added, receiving a random access response (RAR) message from the SCell to be added, and applying, when the SCell add command includes an indicator indicating that the first eNB to which the SCell to be added belongs differs from the eNB to which the PCell belongs, a parameter included in the RAR for the SCell in which the RAR has been transmitted.

Figure 18:
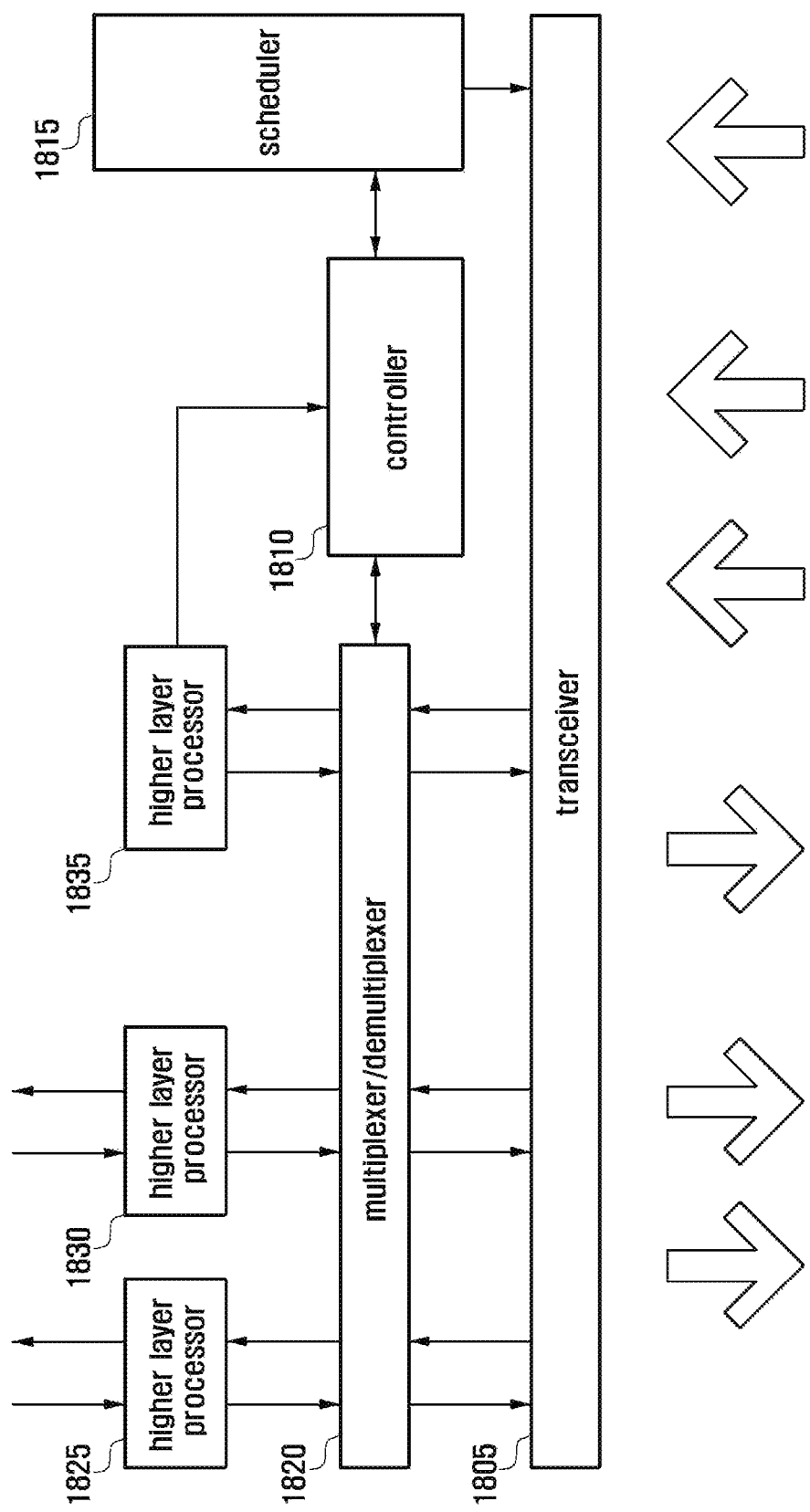
FIG. 18 is a block diagram illustrating an eNB according to an embodiment of the present invention.

FIG. 18 is a block diagram illustrating an eNB according to an embodiment of the present invention.

The eNB includes a transceiver 1805, a controller 1810, a multiplexer/demultiplexer 1820, a control message processor 1835, various higher layer processors 1825 and 1830, and a scheduler 1815.

The transceiver transmits data and predetermined control signals on the downlink channel of the serving cell and receives data and predetermined control signals on the uplink channel. In the case that a plurality of carriers is configured, the transceiver 1805 transmits/receives data and control signals through the plural carriers.

The multiplexer/demultiplexer 1820 is responsible for multiplexing data generated by the higher layer processors 1825 and 1830 and the control message processor 1835 or demultiplexing the data received by the transceiver 1805, the demultiplexed data being delivered to the control message processor 1835 or the controller 1810. The control message processor 1835 processes the control message transmitted by the UE and takes a necessary action or generates a control message to be transmitted to the UE, the generated control message being delivered to the lower layer.

The higher layer processors 1825 and 1830 are established per service and processes the data from the S-GW or other eNB into RLC PDU, the RLC PDU being delivered to the multiplexer/demultiplexer 1820, and processes the RLC PDU from the multiplexer/demultiplexer 1820 into PDCP SDU, the PDCP SDU being transmitted to the S-GW or other eNB.

The scheduler allocates transmission resource to the UE at an appropriate timing in consideration of the UE buffer status and channel status and controls the transceiver to process the signal to be transmitted to the UE and transmit the signal.

The controller controls overall operations associated with the random access and SR transmission. In more detail, the controller performs control operations of the eNB as described with reference to FIGS. 5 to 16. For example, the controller may control transmitting a SCell add command including configuration information on the secondary serving cell (SCell) to be added to the UE. The controller also may control receiving the preamble transmitted by the UE and transmitting, when the first eNB to which the SCell to be added belongs differs from the second eNB to which the PCell belongs, a random access response (RAR) message to the UE.

Although preferred embodiments of the invention have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

Accordingly, it should be understood that above-described embodiments are essentially for illustrative purpose only but not in any way for restriction thereto. Thus the scope of the invention should be determined by the appended claims and their legal equivalents rather than the specification, and various alterations and modifications within the definition and scope of the claims are included in the claims.

What is claimed is:

1. A method performed by a terminal in a wireless communication system, the method comprising:
identifying whether a number of transmissions of a random access preamble satisfies a pre-defined condition associated with a maximum transmission number;
performing a first procedure in case that the random access preamble is transmitted on a first primary cell of a master cell group (MCG) associated with a first base station and the number of transmissions of the random access preamble satisfies the pre-defined condition; and
performing a second procedure in case that the random access preamble is transmitted on a second primary cell of a secondary cell group (SCG) associated with a second base station and the number of transmissions of the random access preamble satisfies the pre-defined condition,
wherein the second procedure is different from the first procedure.

2. The method of claim 1, wherein performing of the first procedure comprises:
initiating a radio resource control (RRC) connection re-establishment procedure.

3. The method of claim 2, wherein initiating the RRC connection re-establishment procedure comprises:
transmitting a message for requesting a RRC connection re-establishment.

4. The method of claim 1, wherein performing of the second procedure comprises:
releasing a physical uplink control channel (PUCCH) resource for the second primary cell of the SCG.

5. The method of claim 4, wherein performing of the second procedure further comprises:
transmitting a message including information indicating an RRC connection failure associated with a random access on the second primary cell of the SCG.

6. The method of claim 5, wherein the message is transmitted on the first primary cell of the MCG.

7. The method of claim 1, wherein the pre-defined condition is associated with at least one of a first maximum transmission number for the first primary cell of the MCG or a second maximum transmission number for the second primary cell of the SCG.

8. A terminal in a wireless communication system, the terminal comprising:
a transceiver; and
a controller coupled with the transceiver and configured to control to:
identify whether a number of transmissions of a random access preamble satisfies a pre-defined condition associated with a maximum transmission number,
perform a first procedure in case that the random access preamble is transmitted on a first primary cell of a master cell group (MCG) associated with a first base station and the number of transmissions of the random access preamble satisfies the pre-defined condition, and
perform a second procedure in case that the random access preamble is transmitted on a second primary cell of a secondary cell group (SCG) associated with a second base station and the number of transmissions of the random access preamble satisfies the pre-defined condition,
wherein the second procedure is different from the first procedure.

9. The terminal of claim 8, wherein the controller is configured to:
initiate a radio resource control (RRC) connection re-establishment procedure as the first procedure.

10. The terminal of claim 9, wherein the controller is configured to:
transmit a message for requesting a RRC connection re-establishment for the RRC connection re-establishment procedure.

11. The terminal of claim 8, wherein the controller is configured to:
release a physical uplink control channel (PUCCH) resource for the second primary cell of the SCG as the second procedure.

12. The terminal of claim 11, wherein the controller is further configured to:

transmit a message including information indicating an RRC connection failure associated with a random access on the second primary cell of the SCG as the second procedure.

13. The terminal of claim 12, wherein the message is transmitted on the first primary cell of the MCG.

14. The terminal of claim 8, wherein the pre-defined condition is associated with at least one of a first maximum transmission number for the first primary cell of the MCG or a second maximum transmission number for the second primary cell of the SCG.

\* \* \* \* \*